US006874221B2

(12) United States Patent
Jansen et al.

(10) Patent No.: US 6,874,221 B2
(45) Date of Patent: Apr. 5, 2005

(54) SENSORLESS CONTROL INDUCTION MOTOR ROTOR SLOT SHAPES AND FABRICATION METHODS

(75) Inventors: Patrick Lee Jansen, Alplaus, NY (US); Steven Wells Weissner, Fort Wayne, IN (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/304,673

(22) Filed: Nov. 27, 2002

(65) Prior Publication Data

US 2003/0102762 A1 Jun. 5, 2003

Related U.S. Application Data

(62) Division of application No. 09/433,760, filed on Nov. 4, 1999, now Pat. No. 6,515,395, which is a division of application No. 09/127,948, filed on Aug. 3, 1998, now Pat. No. 6,058,596.

(51) Int. Cl.$^7$ .............................................. H02K 15/02

(52) U.S. Cl. .......................................... 29/596; 29/598

(58) Field of Search ..................... 29/596, 598; 310/42, 310/216–217, 261, 210, 211, 212

(56) References Cited

U.S. PATENT DOCUMENTS

| | | | | | |
|---|---|---|---|---|---|
| 2,125,970 | A | * | 8/1938 | Waters .......................... | 29/598 |
| 3,802,068 | A | * | 4/1974 | Scott ............................ | 29/598 |
| 4,214,921 | A | * | 7/1980 | Henderson ................... | 148/246 |
| 4,425,521 | A | | 1/1984 | Rosenberry, Jr. et al. | |
| 4,782,260 | A | * | 11/1988 | Gandhi et al. ............... | 310/216 |
| 5,044,237 | A | * | 9/1991 | Frame ........................... | 83/41 |
| 5,155,404 | A | | 10/1992 | Adarangani | |

(Continued)

FOREIGN PATENT DOCUMENTS

| | | | | |
|---|---|---|---|---|
| CA | 5548172 | | 8/1996 | ................. 310/156 |
| JP | 59-17853 | * | 1/1984 | ................. 310/211 |

OTHER PUBLICATIONS

J. Cilia, et al, Sensorless Position Detection for Vector–Controlled Induction Motor Drives Using an Asymmetric Outer–Section Cage, Sep./Oct. 1997 IEEE Trans. on Ind Appl., vol. 33, No. 5, pp. 1162–1169.

L. Getmar, et al, "Rotor Design for Invertor–Fed High Speed Induction Motors", EPE Aachen, 1989, ABB Corp. Research, Sweden, pp. 51–56.

*Primary Examiner*—Tran Nguyen
(74) *Attorney, Agent, or Firm*—Ann M. Agosti; Patrick K. Patnode

(57) ABSTRACT

A method for fabricating an induction motor rotor lamination includes using an indexed notching die to punch a plurality of closed rotor slots at different distances from a center point of rotation by punching a first rotor slot, changing the position of a center point of the rotor lamination with respect to the notching die, and punching a second rotor slot. In another embodiment, a plurality of rotor slit patterns are punched using a variable depth indexed notching die including at least two rotor slit punching portions, one being deeper than another, by punching a first rotor slit pattern, changing the depth of closure of the notching die, and punching a second rotor slit pattern with the second rotor slit pattern having a different number of rotor slits than the first. In another embodiment, each rotor slit is open to and off center with respect to its respective rotor slot, and rotor laminations are stacked by positioning some of the rotor laminations in an orientation with is turned over and rotated with respect to others of the rotor laminations; filling the rotor slots and the rotor slits with cage material; and machining outer surfaces of the rotor laminations. In another embodiment, uniformly spaced identical rotor slots are punched and modulation is created by punching a contoured outside diameter or by inserting slot wedges of molded magnetic material.

11 Claims, 23 Drawing Sheets

U.S. PATENT DOCUMENTS

| | | | | |
|---|---|---|---|---|
| 5,174,009 A | * | 12/1992 | Martin | 29/564.6 |
| 5,565,752 A | | 10/1996 | Jansen et al. | |
| 5,585,709 A | | 12/1996 | Jansen et al. | |
| 5,604,971 A | * | 2/1997 | Steiner | 29/596 |
| 5,799,387 A | * | 9/1998 | Neuenschwander et al. | 29/598 |
| 5,937,508 A | * | 8/1999 | Shiga | 29/598 |
| 6,047,460 A | * | 4/2000 | Nagate et al. | 29/598 |
| 6,058,596 A | * | 5/2000 | Jansen et al. | 29/598 |
| 6,515,395 B1 | * | 2/2003 | Jansen | 310/211 |

* cited by examiner

SENSORLESS CONTROL INDUCTION MOTOR ROTOR SLOT SHAPES AND FABRICATION METHODS

This application is a division of application Ser. No. 09/433,760, filed Nov. 4, 1999 now U.S. Pat. No. 6,515,395, which is a Division of Ser. No. 09/127,948, filed Aug. 3, 1998, now U.S. Pat. No. 6,058,596 issued May 9, 2000, which is hereby incorporated by reference in its entirety.

BACKGROUND OF THE INVENTION

Closed loop operation of induction motor drive systems without shaft transducers is commonly referred to as sensorless, tachless, or transducerless. Eliminating the need for rotor shaft transducers such as encoders, resolvers, and tachometers for position and velocity estimations in an induction motor drive system can reduce system cost, improve system reliability, and reduce the total motor package size.

Several approaches for providing sensorless control of induction motors are described in U.S. Pat. Nos. 5,565,752 and 5,585,709 wherein a determinist spatial modulation in the rotor leakage inductance of the induction motor is tracked via the demodulation of an injected AC signal voltage or current. Tracking of the modulated rotor leakage inductance provides an estimate of the rotor position and velocity that can then be used for sensorless control.

U.S. Pat. No. 5,565,752 describes induction motor rotors with spatial variations in the rotor leakage inductance to enable rotor position and velocity tracking. The patent describes special rotor slot designs that have either open slots or a combination of open and closed slots. Although large motors often have bar wound rotors with open slots, the majority of conventional small induction motors, however, are fabricated with closed rotor slots with the rotor bars being cost-effectively formed by casting molten aluminum (these rotors are usually machined and sometimes the bridges are removed and the slots are opened after casting). U.S. Pat. No. 5,565,752 does not disclose manufacturing methods or rotor designs that are readily manufacturable with existing industrial casting processes and equipment.

SUMMARY OF THE INVENTION

It is therefore seen to be desirable to provide a cost effective method of creating spatial modulation. The present invention provides rotor lamination fabrication techniques to create the desired spatial modulation in the rotor leakage inductance and/or the rotor resistance which can be used with AC signal injection to track rotor positions and velocities.

Briefly, in accordance with one embodiment of the present invention, a method for fabricating an induction motor rotor lamination comprises using an indexed notching die to punch a plurality of closed rotor slots at different distances from a center point of rotation by first punching a first rotor slot, changing the position of a center point of the rotor lamination with respect to the notching die, and then punching a second rotor slot.

Another method for fabricating an induction motor rotor lamination comprises: punching a plurality of closed rotor slots and rotor slits in a lamination; and using an indexed notching die having a wider rotor slit to selectively punch and widen predetermined ones of the rotor slits.

Another method for fabricating an induction motor rotor lamination comprises: punching a plurality of rotor slit patterns using a variable depth indexed notching die including at least two rotor slit punching portions, one of the rotor slit punching portions being deeper than another of the rotor slit punching portions, by punching a first rotor slit pattern, changing the depth of closure of the notching die, and punching a second rotor slit pattern, the second rotor slit pattern having a different number of rotor slits than the first rotor slit pattern.

Another method for fabricating an induction motor rotor comprises: providing a plurality of rotor laminations each including a plurality of rotor slots situated at different distances from a center point of rotation and a plurality of rotor slits, each rotor slit being open to and off center with respect to its respective rotor slot; stacking the plurality of rotor laminations by positioning some of the rotor laminations in an orientation which is turned over and rotated with respect to others of the rotor laminations; filling the rotor slots and the rotor slits with cage material; and machining outer surfaces of the rotor laminations.

In another embodiment of the present invention, uniformly spaced identical rotor slots are punched and modulation is created by punching a contoured outside diameter or by inserting slot wedges of molded magnetic material.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF PREFERRED EMBODIMENTS OF THE INVENTION

Some of the rotor slot shape and rotor bar embodiments of the present invention relate to inductance modulation, whereas others of the embodiments of the present invention relate to resistance modulation. Typically on larger machines (such as machines with greater than ten horsepower, for example), inductance modulation is most useful due to the fact that a high percentage of the total impedance results from inductance. On smaller machines (such as machines with less than ten horsepower, for example), inductance modulation, resistance modulation, or a combination of inductance modulation and resistance modulation can be useful for sensorless motor control. Preferably, for inductance modulation and particularly for resistance modulation, the cross sectional areas of each rotor slot shape are within one percent of each other such that the DC resistances of each bar are essentially identical. A spatial variation in the DC resistances will create undesirable torque ripple at the fundamental component slip frequency.

FIGS. 1–18 illustrate rotor slot embodiments of the present invention that are useful for creating inductance modulation in induction motors designed for sensorless control.

Figure 1:
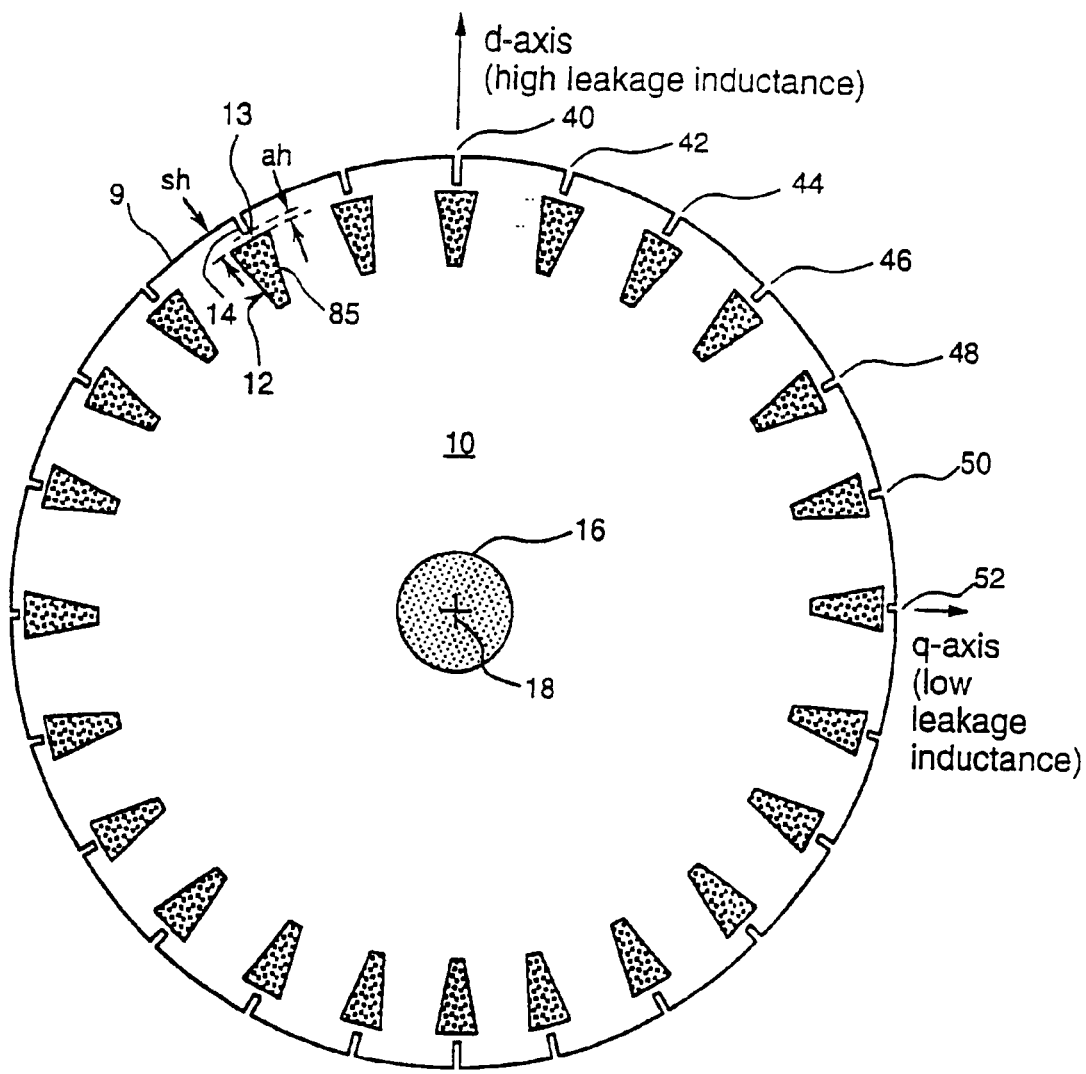
FIG. 1 is a top view of a two-pole rotor lamination of the present invention.

In one embodiment of the present invention, as shown in FIG. 1, a rotor 10 with a shaft 16 and a center point 18 of rotation has a plurality of saturable slot bridges 13 which are formed between rotor slots 12 and rotor slit patterns which are shown in FIG. 1 as air slits 14. As discussed below, a rotor slit pattern may comprise one or more air slits or slits which include rotor cage material.

The rotor slots and air slit combinations of FIG. 1 are suitable for using rotor cage material 85 which comprises either fabricated or cast rotor cages. Typically fabricated rotor cages include copper rotor bars, and cast rotor cages are made with molten aluminum. The rotor slot bridges enable the rotor to be cast without requiring special casting jigs or containment fixtures to prevent molten aluminum from escaping the rotor slots, while still introducing a desired spatial modulation in rotor leakage inductance.

The desired spatial modulation in rotor leakage inductance for sensorless control can be created by varying the length of the air slits. In one embodiment, the distances of the rotor slots from the center point 18 of the rotor lamination are additionally varied. FIG. 1 shows these variations for a two pole machine where the air slit length decreases from air slit 40 through air slits 42, 44, 46, 48, 50, and 52 and then increases.

Rotor slots positioned with shallow air slits (with the shallowest represented by air slit 52) result in a lower localized leakage inductance compared to slots with deep air slits. A modulation that is trackable from the stator windings is obtained by having the variation in length periodic with each pole, as shown. In FIG. 1, uniform widths of the air slits are used to maintain a uniform and symmetric magnetizing inductance and thereby avoid the introduction of undesirable synchronous reluctance torque.

The slots are designed to maximize the spatial modulation in rotor leakage inductance created by variation in the air slits while minimizing the variation caused by the rotor slot bridge saturation under loaded operating conditions. To accomplish this, the bridge 13 height (ah) should be as short as possible, and the air slits should be as narrow and have an average height (sh) as long as possible to maximize the desired saliency. Limitations on narrowness and average length will be set primarily by manufacturing considerations, although undesirable saturation of the slit region can occur if it is too narrow under loaded operating conditions. Thinner laminations generally enable narrower slot structures to be punched.

The laminations are stacked such that slots of equal air slit length are aligned axially. As is common practice, the laminations can be rotated during stacking to prevent uneven stack build-up due to non-uniform lamination thickness. The only restriction is that the rotations for a two pole embodiment are in increments of one pole pitch (180 electrical degrees). No restrictions are placed on the common practice of rotor skewing.

Rotor laminations 10 can be punched by compound dies or by indexed notching dies. Compound dies include dies such as progressive dies and cluster dies which can punch the rotor slots (and slits if applicable) with a single punching step. These dies are expensive to create and are good for high volume applications. Indexed notching dies typically create a single slot and/or slit at a time with the die or the rotor lamination being rotated prior to the punching of the next slot.

Figure 2:
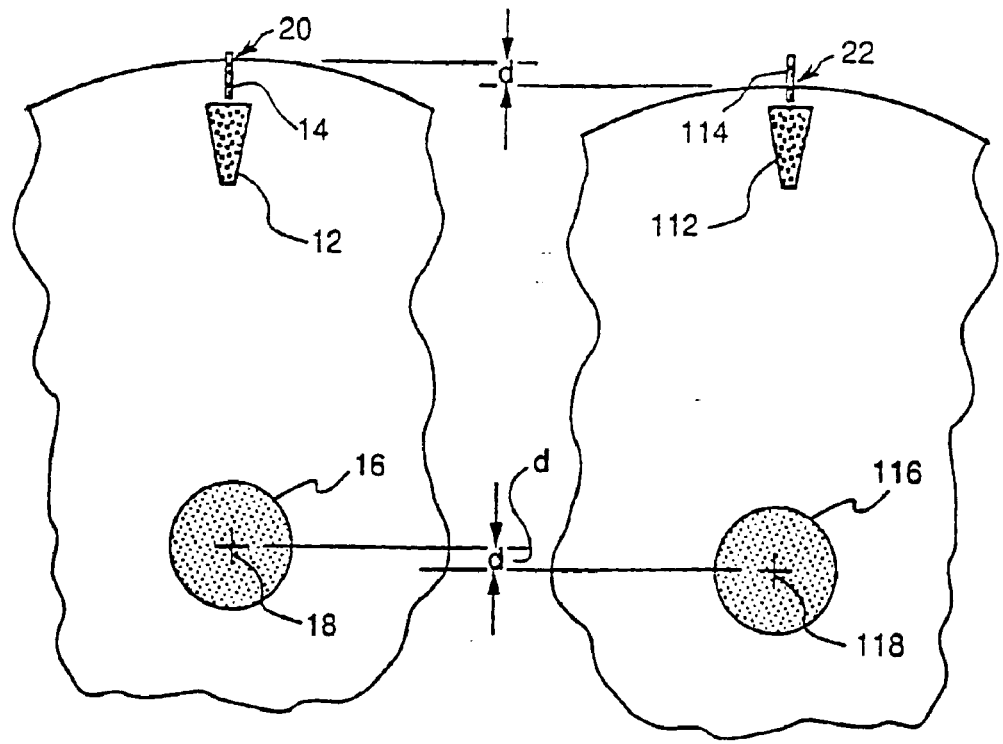
FIG. 2 is a top view of rotor lamination positions during die punching of the rotor lamination of the embodiment of FIG. 1.

FIG. 2 is a top view of rotor lamination positions during indexed die punching according to one embodiment of the present invention. An indexed die is not shown in FIG. 2, but one example of an indexed die is provided in FIG. 8. A die for forming slits in FIG. 2 would have one slot punch and one slit punch.

In the embodiment of FIG. 2, a single notching die can be used by varying the position of the rotor lamination center point relative to the notching die. This can be achieved by either moving the notching die as the rotor lamination is indexed or, preferably, by moving the location of the rotor lamination center point as it is indexed while keeping the die fixed. As shown in FIG. 2, rotor lamination center point 118 can be shifted by a distance d from rotor lamination center point 18 to create a slot 112/air slit 114 combination 22 which has an air slit which is shorter by distance d than the slot 12/air slit 14 combination 20. Existing indexed punch presses can be modified via the addition of a servo mechanism to provide the controlled movement of the rotor lamination center point.

Figure 3:
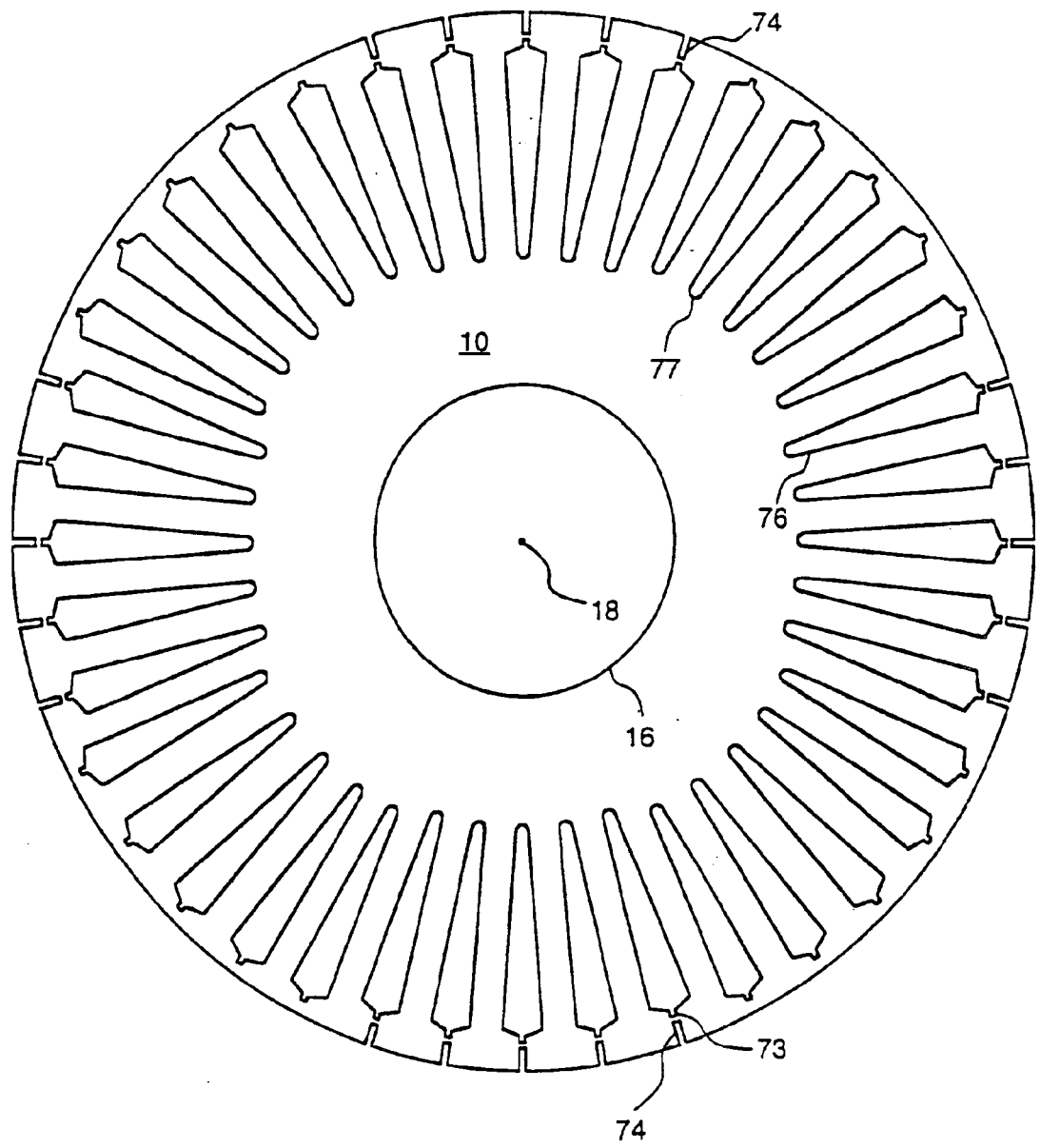
FIG. 3 is top view of a partially fabricated rotor lamination of the present invention.

FIG. 3 is top view of a four pole rotor lamination of the present invention, In this embodiment, a combination of open rotor slots 77 (shown as open in FIG. 5 and in a pre-opened form in FIG. 3) and closed rotor slots 76 with air slits 74 (separated by bridges 73) are used to create the desired variation in rotor leakage inductance. The rotor slots are all initially formed as closed rotor slots as shown in FIG. 3 to facilitate casting. A progressive die can be used or single slot die can be used to create the variation via translation of the indexing machine spindle as per FIG. 2. Key ways (not shown) can be used to help with alignment.

Figure 4:
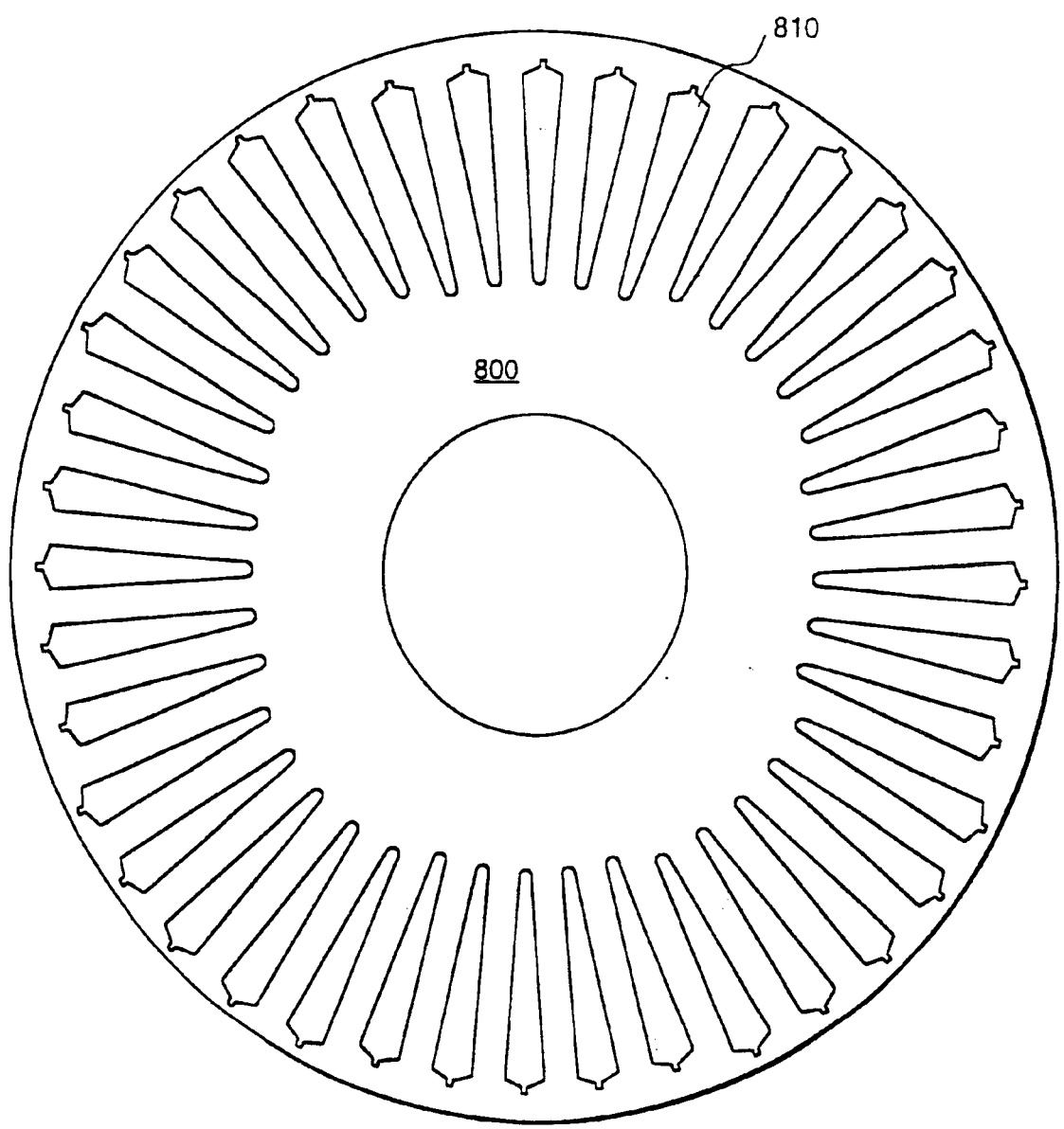
FIG. 4 is a top view of a masking lamination which can be used during rotor cage casting to prevent molten material from entering the air slits in the rotor lamination of FIG. 3.

FIG. 4 is a top view of a masking lamination 800 having openings 810 which can be used during rotor cage casting to prevent molten material from entering the air slits. This masking lamination can be placed at each end of the rotor stack aligned with the slots of lamination 10 prior to casting. The masking laminations can be created in a similar manner as lamination 10 via a cluster or single indexed notching die which does not have the air slit features.

Figure 5:
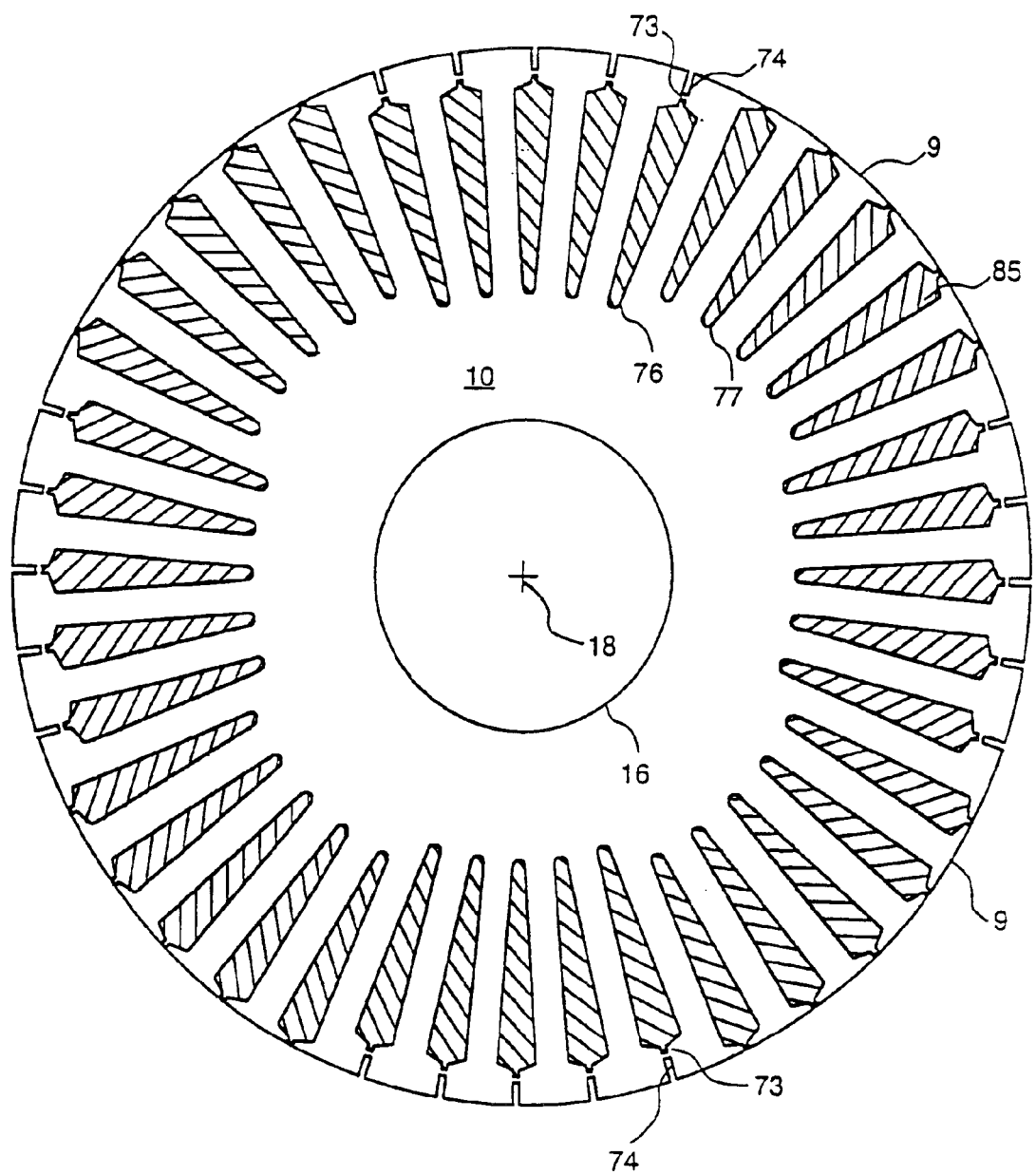
FIG. 5 is a top view of the lamination of FIG. 3 after casting and machining to the desired rotor outside diameter.

FIG. 5 is a top view of the lamination of FIG. 3 after casting rotor cage material 85 and machining the outer surface 9 of the rotor lamination to obtain the desired diameter. After molten material 85 is poured in the rotor slots and is hardened, open slots 77 can be created by a machining operation such as for example, by turning the lamination stack on a lathe to remove the slot bridge on specific slots. The open slots are less sensitive to saturation effects than closed slots 84 and thus should enable improved controllability.

Figure 6:
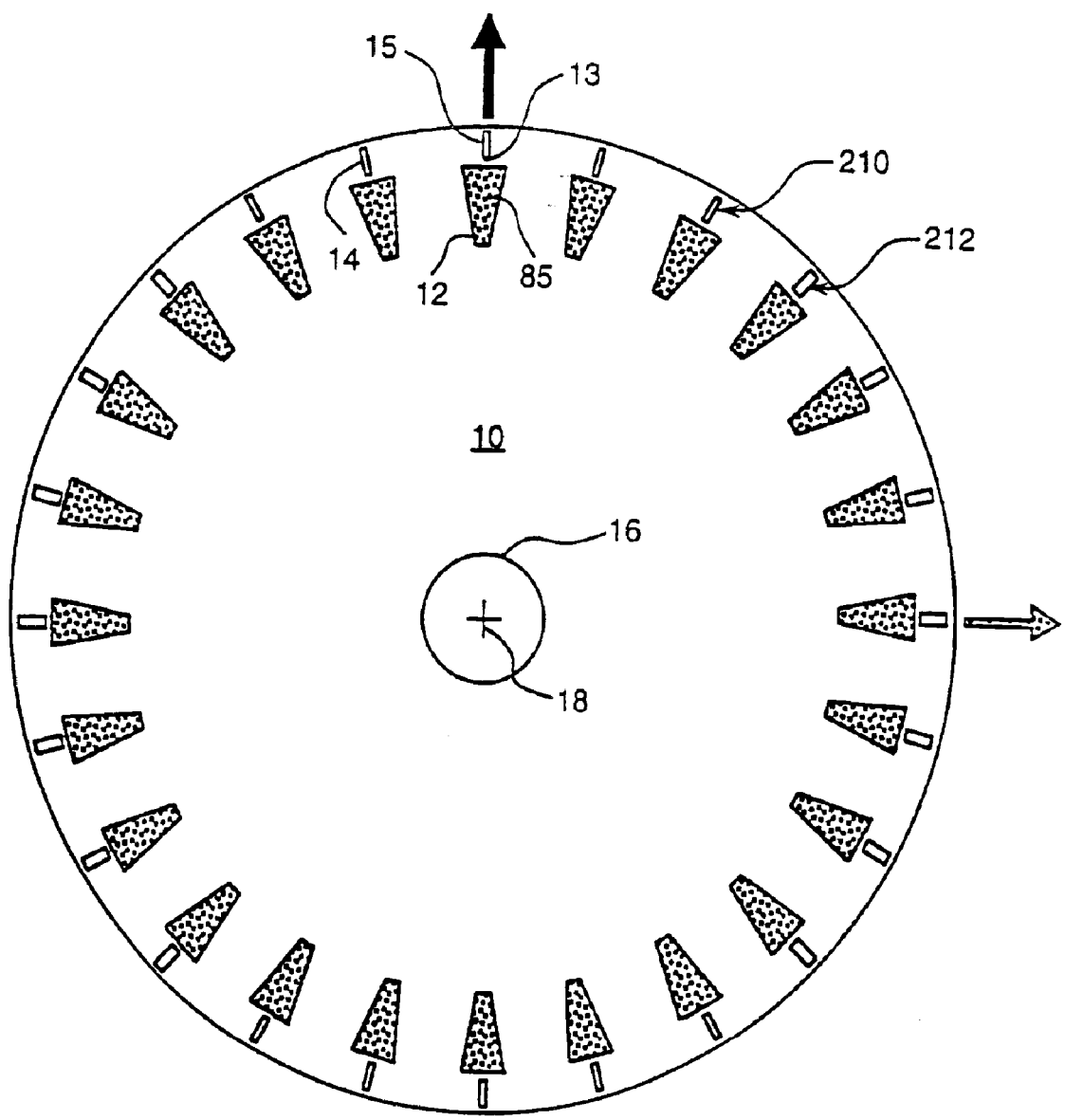
FIG. 6 is a top view of another rotor lamination of the present invention.

FIG. 6 is a top view of another rotor lamination 10 of the present invention. In this embodiment, rotor slots 12 are each at about the same distance from the center point 18, and the rotor leakage inductance modulation is created by using air slits with varying width. As shown in the two pole configuration of FIG. 6, some of air slits 210 have narrower widths than other air slits 212. A wider slit will produce a smaller rotor leakage inductance than a narrower slit.

Each slot has two effective rotor slot bridges. An inner bridge 13 is closest to the rotor conductor 85 and provides a barrier to retain the molten aluminum during casting. An optional outer bridge 15 facilitates the turning (machining) of the rotor outer diameter and minimizes lamination smearing. (A similar outer bridge can be added to the air slit 74 in the FIG. 3 embodiment if a compound type die is used for punching.) The bridges should be designed to be as thin as possible to minimize the effects of saturation on the overall rotor leakage inductance. Ideally, the inductance associated with the air slit region should dominate the overall rotor leakage inductance.

Either compound or indexed notching dies can used to punch the rotor laminations. With indexed notching dies, as commonly used for larger motors, the manufacturing of the rotor lamination can be accomplished in either two or three steps.

Figure 7:
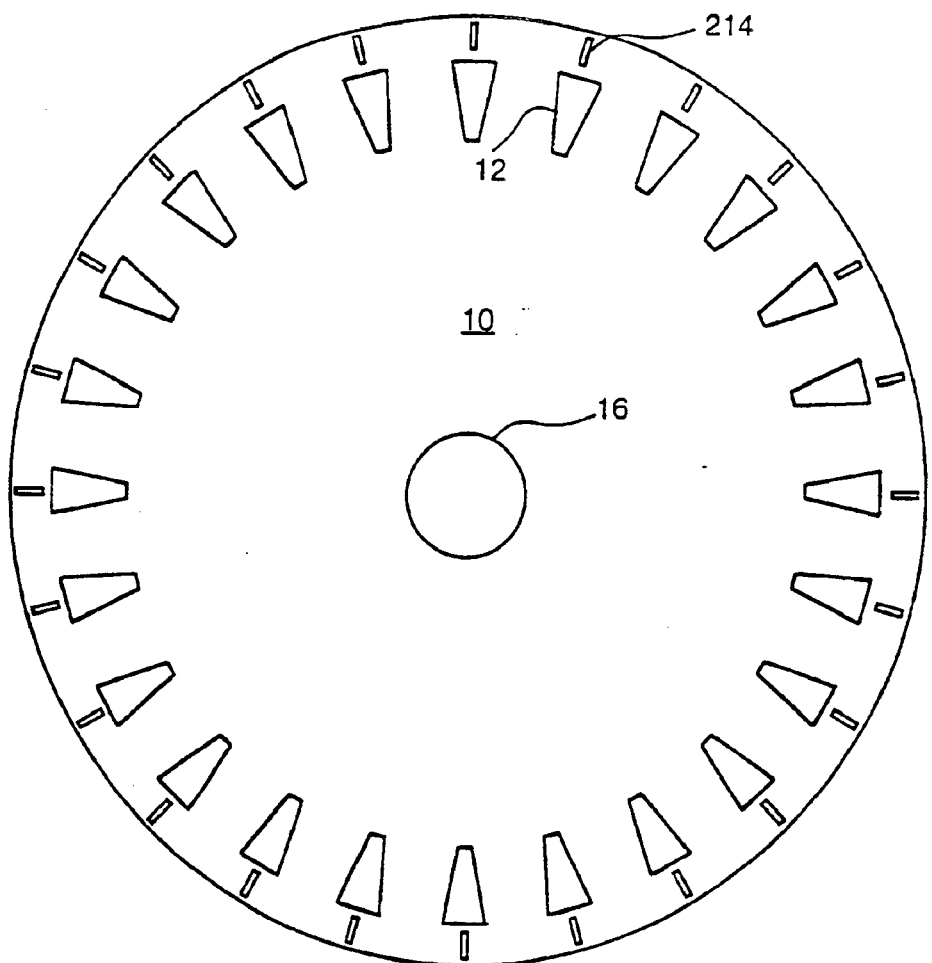
FIG. 7 is a top view of a partially fabricated rotor lamination of the present invention.

In one embodiment, as shown in FIG. 7, a symmetrical lamination is first created with narrow slits 214. This lamination can be fabricated using either one or two passes through a punching press. For a one pass fabrication technique, the notching die must include both the rotor slot punch and the air slit punch. Alternatively, separate dies can be used to create the rotor slots and the air slits using two separate passes. A final pass using a wider air slit die is then used to introduce the spatial modulation by punching over selected air slits for each pole. This embodiment uses a punch press having the capability of indexing the rotor lamination without punching.

Figure 8:
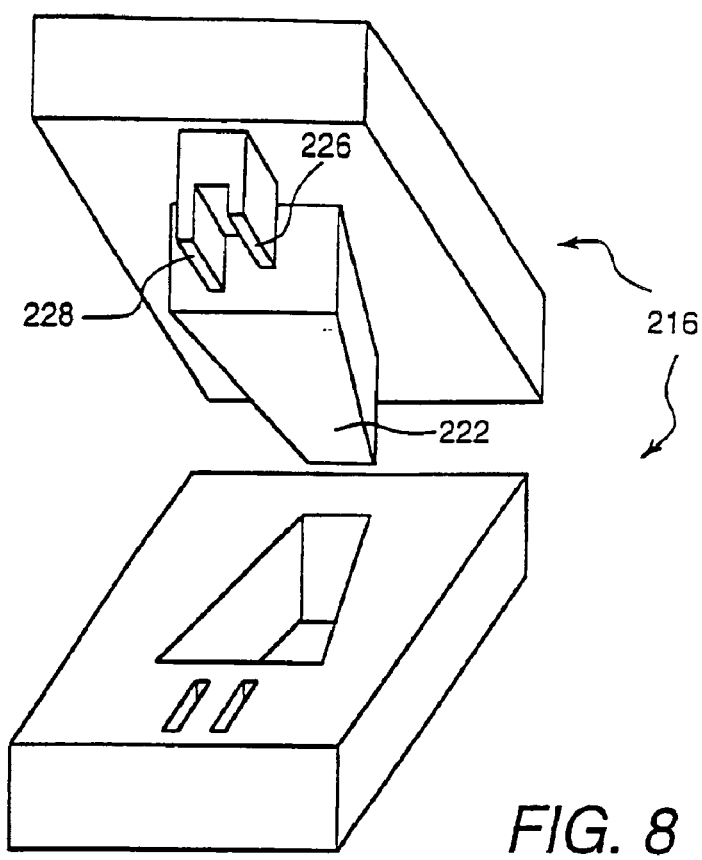
FIG. 8 is a perspective view of a variable depth notching die of the present invention.
Figures 9, 10:
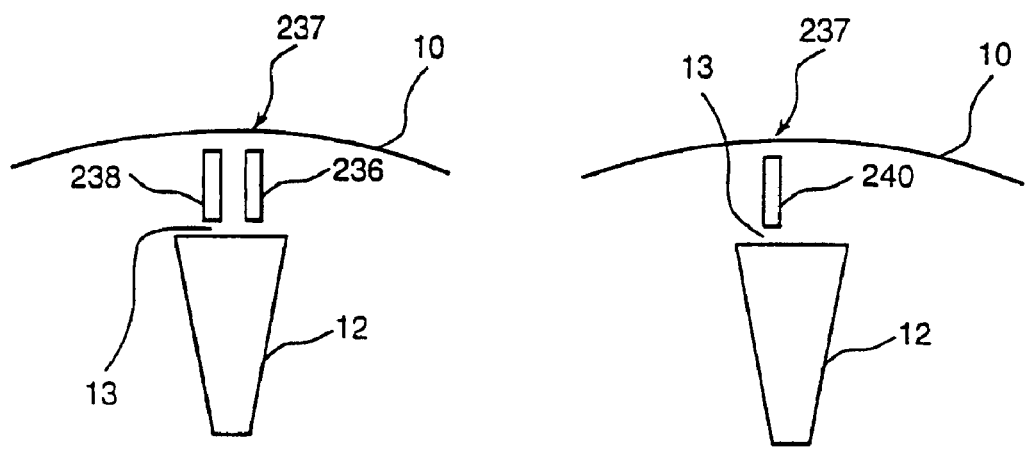
FIGS. 9 and 10 are views of rotor slots and air slits which can be fabricated with the notching die of FIG. 8.

FIG. 8 is a perspective view of a variable depth notching die 216 of the present invention which can be used to fabricate the rotor slots 12 and rotor slit patterns 237 including air slits 236, 238, and 240 of FIGS. 9 and 10 in a single pass. Depending on the depth of closure of the die, rotor slot punching 222 and one or both of the two rotor slit punchings 226 and 228 can punch through the rotor lamination 10. In FIG. 9, the die was closed far enough to create two air slits 238 and 236. In FIG. 10, the die was closed far enough for punching 228 to form air slit 240 but not far enough for the shorter punching 226 to form an air slit.

The advantage of this die is that it enables the rotor lamination to be punched in a single pass through the notching punch press. The press must have the capability of varying between two stroke lengths at each indexed position. The increased complexity of the die is a limitation. The two air slit punching portions of the die should be designed to be replaceable since they may be prone to breakage.

Figure 11:
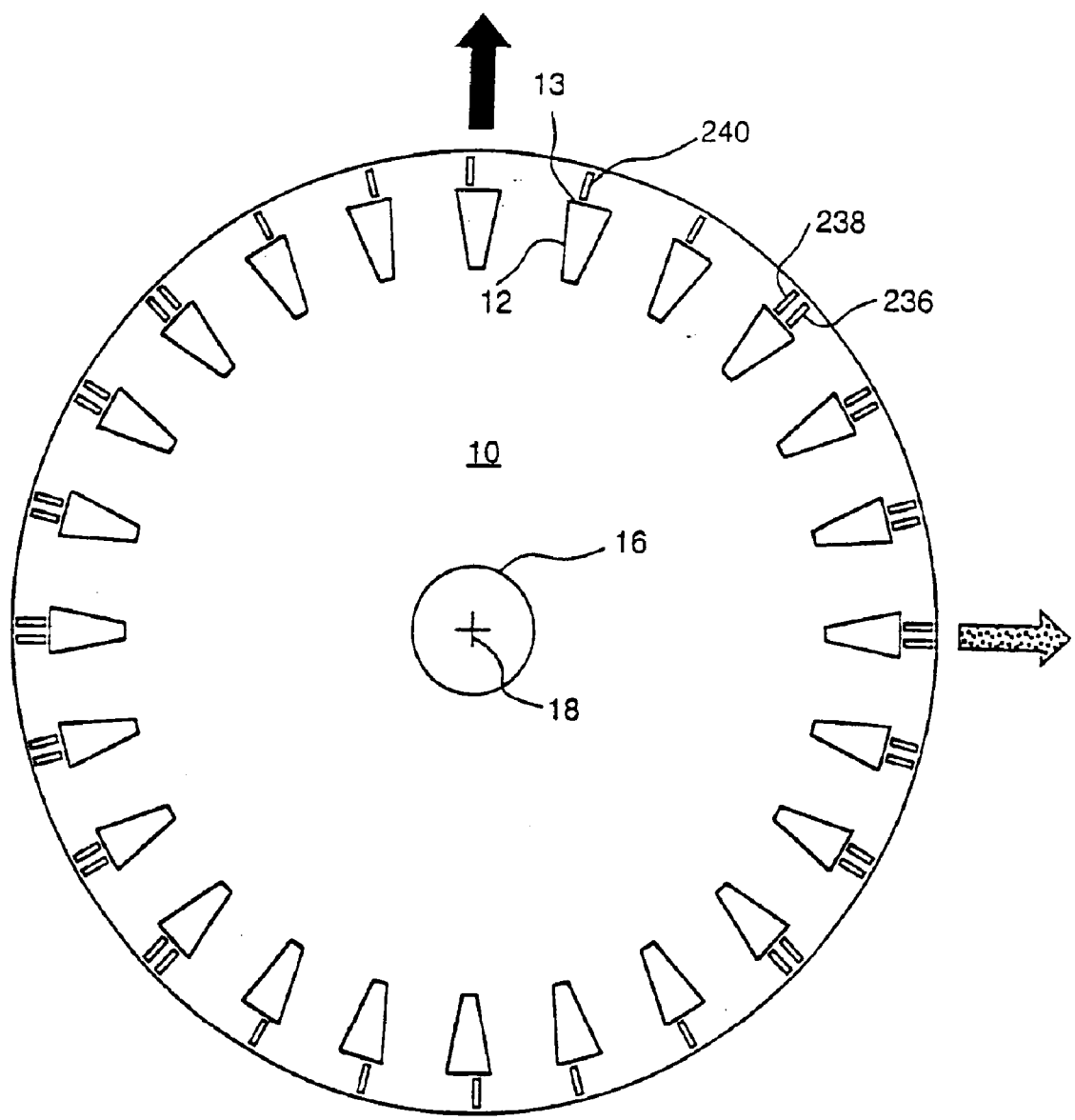
FIG. 11 is a top view of another rotor lamination of the present invention showing a two pole design formed by the die of FIG. 8.

FIG. 11 is a top view of another rotor lamination of the present invention showing a two pole design formed by the die of FIG. 8. This embodiment can alternatively be formed using separate dies over several passes. In one embodiment, one die can be used for the rotor conductor slot area in the first pass and a variable depth die for the two air slits in the second pass. In another embodiment, three separate dies and passes can be used.

Figure 12:
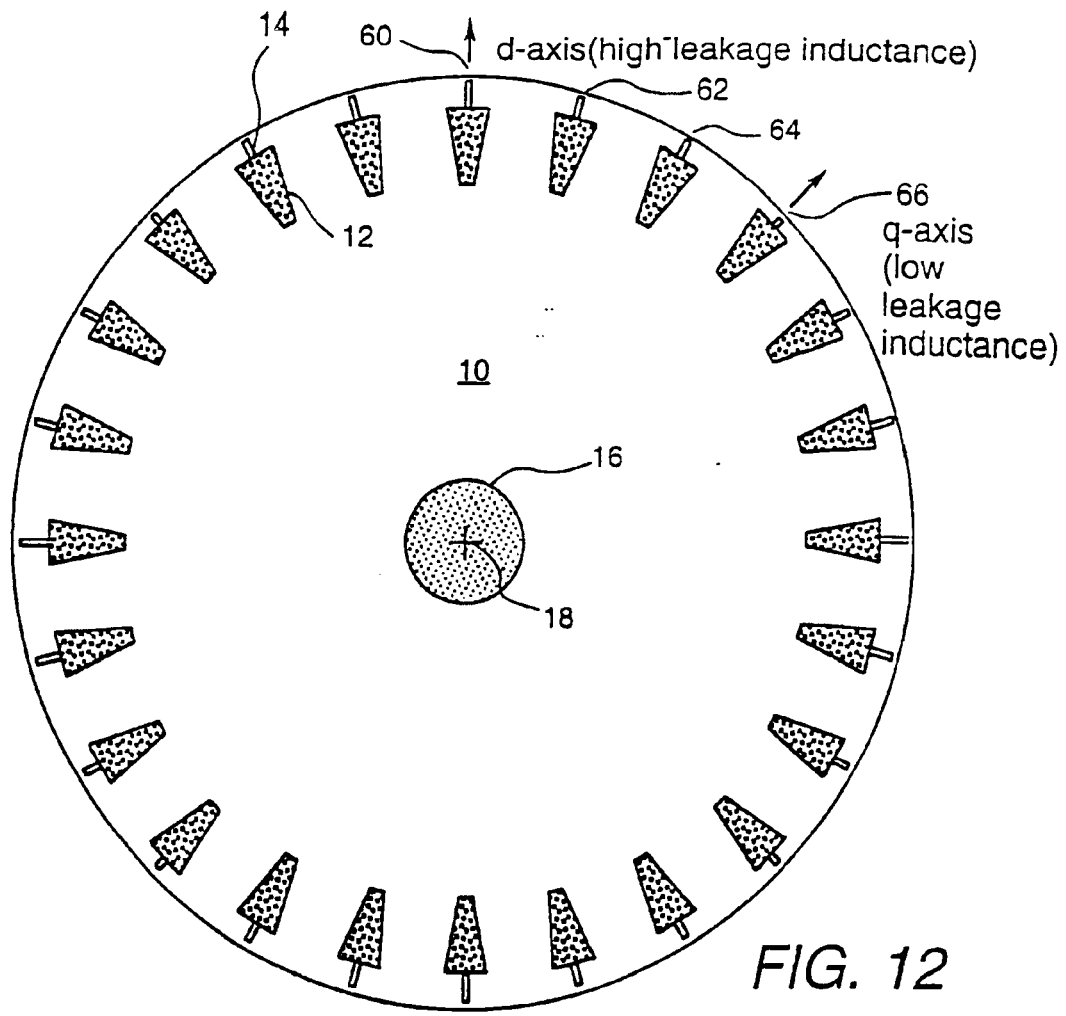
FIG. 12 is a top view of another rotor lamination of the present invention.

FIG. 12 is a top view of a four pole rotor lamination 10 of the present invention wherein the air slits 14 do not extend through the outer surface of rotor lamination 10. As in FIG. 1, the length of the air slits decreases from air slit 60 through air slits 62, 64 and 66. Unlike the embodiment of FIG. 1, in the embodiment of FIG. 12, the rotor slots are open to the rotor slits, and the resulting difficulty in preventing molten aluminum from flowing in the air slits generally precludes the use with cast cage rotors. Furthermore, the spatial modulation cannot be created by a single indexed notching die. For this embodiment, a compound or progressive die is used. One advantage to the embodiment of FIG. 12 is that machining of the outer surface of a rotor is simpler than machining of the surface of a rotor formed with laminations of FIG. 1 wherein the slits are open to the outer rotor surface.

FIGS. 13–16 are top views illustrating another fabrication technique for rotor laminations. In this embodiment, an asymmetrical rotor slot/slit shape combination is created and used with slit length variation and periodic lamination flipping and rotation to create the desired rotor leakage inductance modulation with low rotor leakage saturation effects and low harmonic loss.

Figure 13:
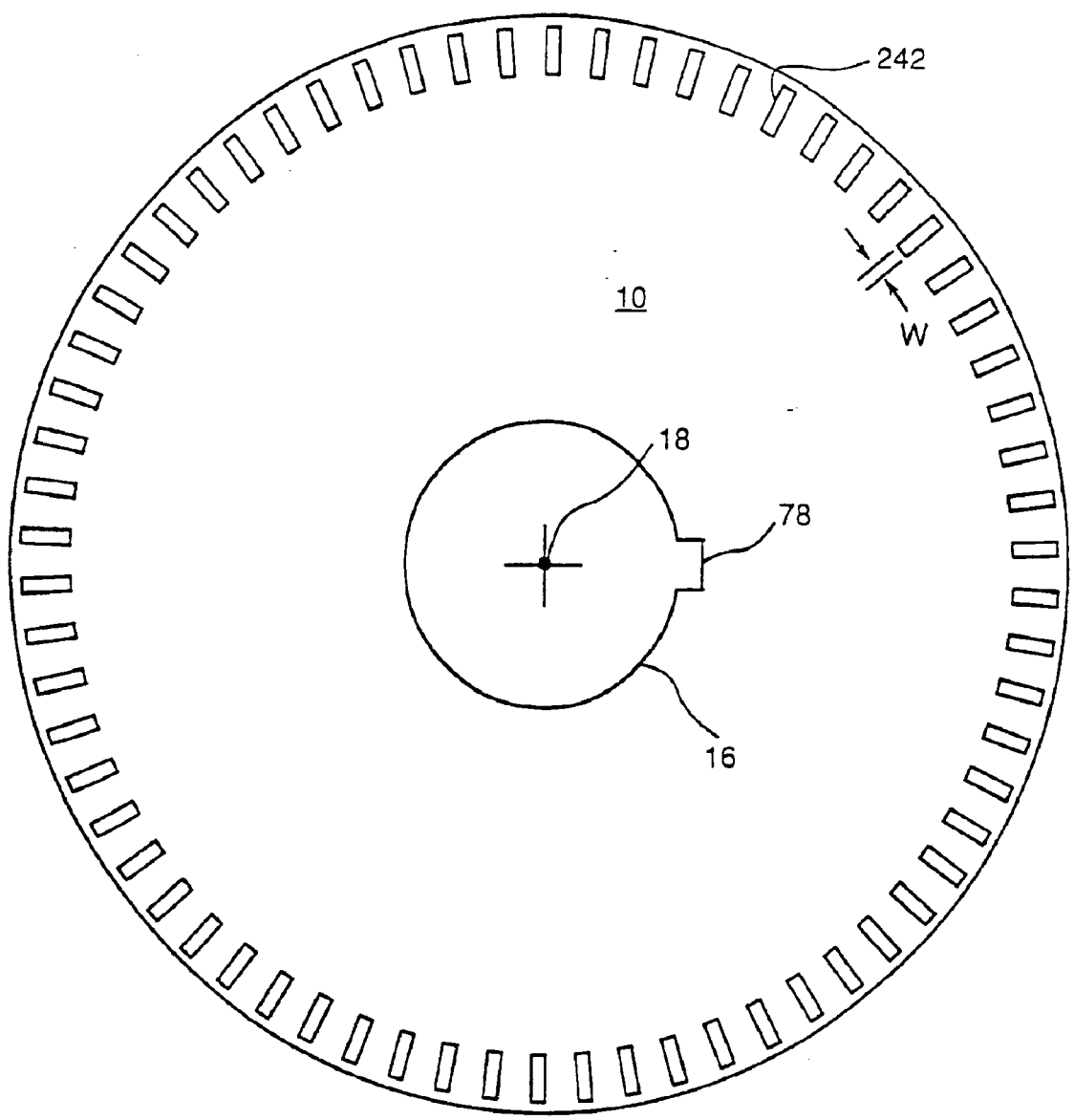
FIGS. 13–16 are top views illustrating another fabrication technique for rotor laminations.

First, a rotor slot die is used to create slits 242 in rotor lamination 10 of FIG. 13. In one embodiment, the slits are not air slits as previously discussed, but will instead be filled with rotor cage casting material. In this embodiment, bridges 241 between the slits and the outer surface of the lamination are preferably present to retain molten aluminum during rotor cage casting. The thickness of the bridge is preferably such that it is entirely removable during a machining operation on a lathe to create the desired rotor outside diameter. As with the previous embodiments, the width of the slit is chosen to minimize saturation of the tooth tip and slit region during loading while still creating the desired net rotor leakage inductance. The width (sw) will typically vary from about 0.152 centimeters (0.060 inches) to about 0.305 centimeters (0.120 inches) for industrial size motors (1–1000 hp) of cast cage construction.

Figure 14:
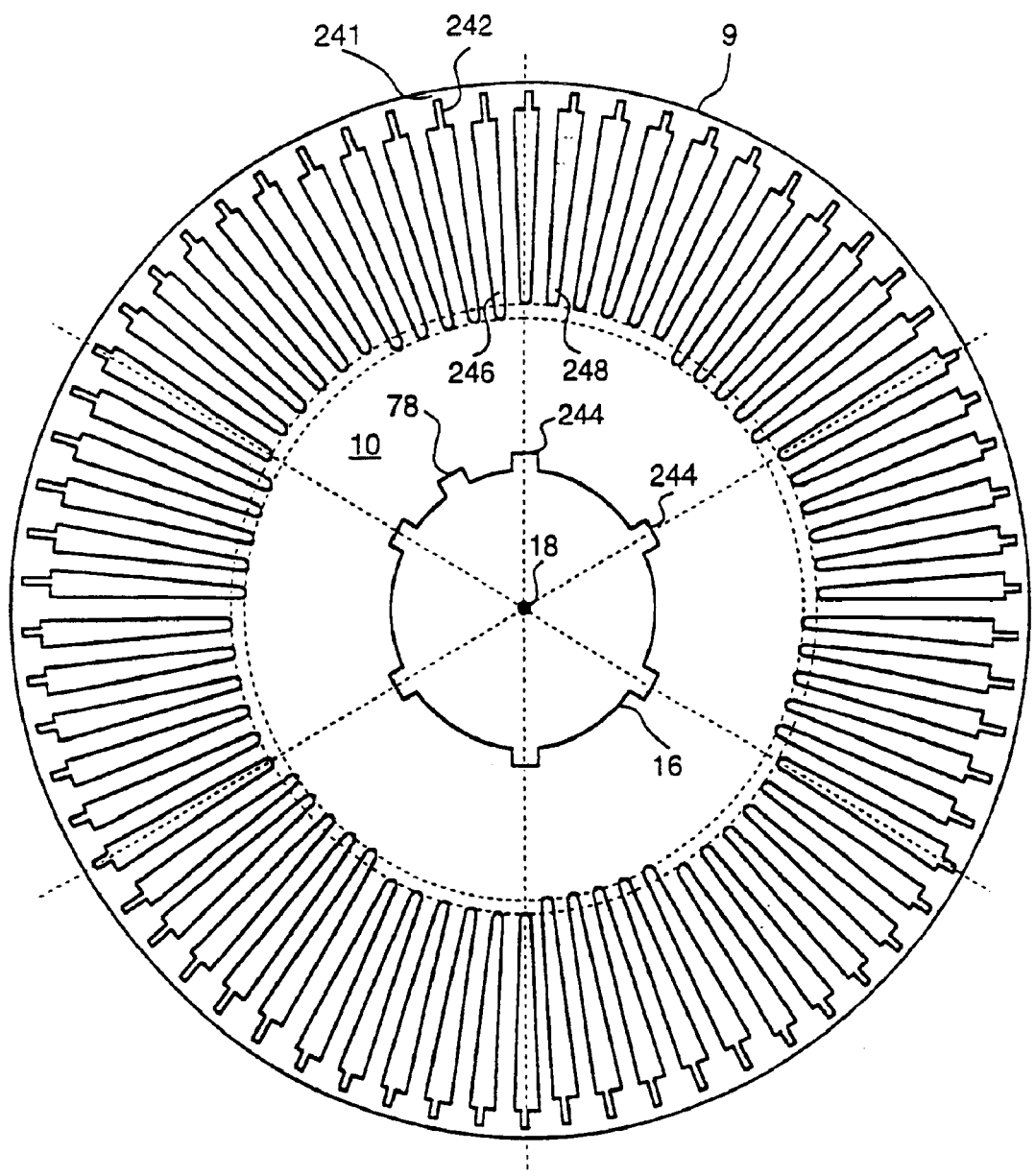

Next, a rotor slot die shape is used to create slots 246 and 248 in the sixty-six slot, six pole rotor lamination of FIG. 14. A variation in the length of the rotor slit can be created by translating the lamination center point of the die as the lamination is indexed. The variation in length results in a spatial modulation in the rotor leakage inductance. In addition to the length variation, the slots are punched off center with respect to slits 242. Key way 78 and additional key ways 244 can be punched to facilitate lamination orientation. The lamination of FIG. 14 can alternatively be created using a progressive die.

Figure 15:
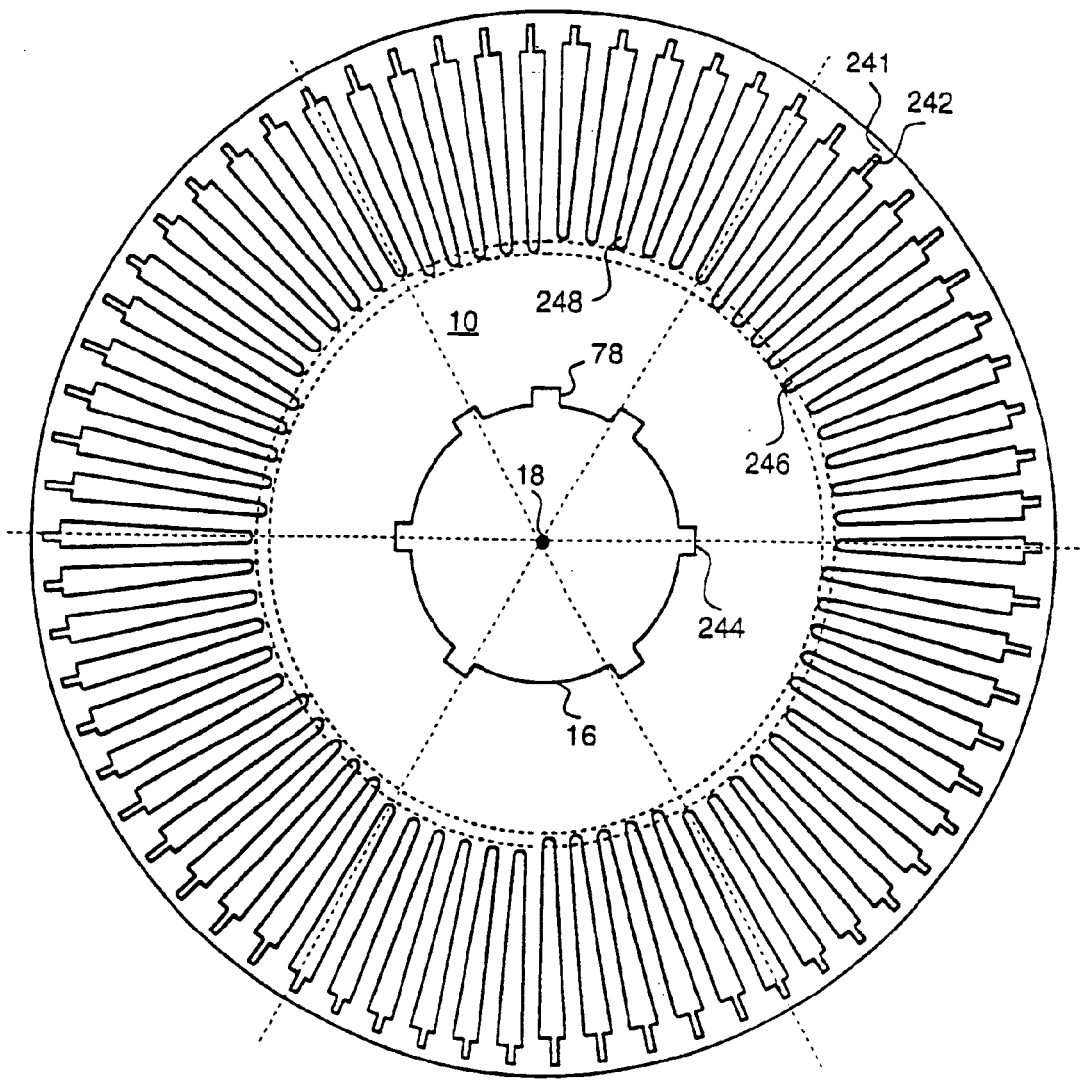

FIG. 15 illustrates a lamination of FIG. 14 after it has been flipped and rotated. During the creation of rotor stacks (shown as stacks 300 in FIGS. 17 and 18), selected laminations or groups of laminations are alternately flipped and rotated as shown in FIG. 15 prior to stacking.

Figure 16:
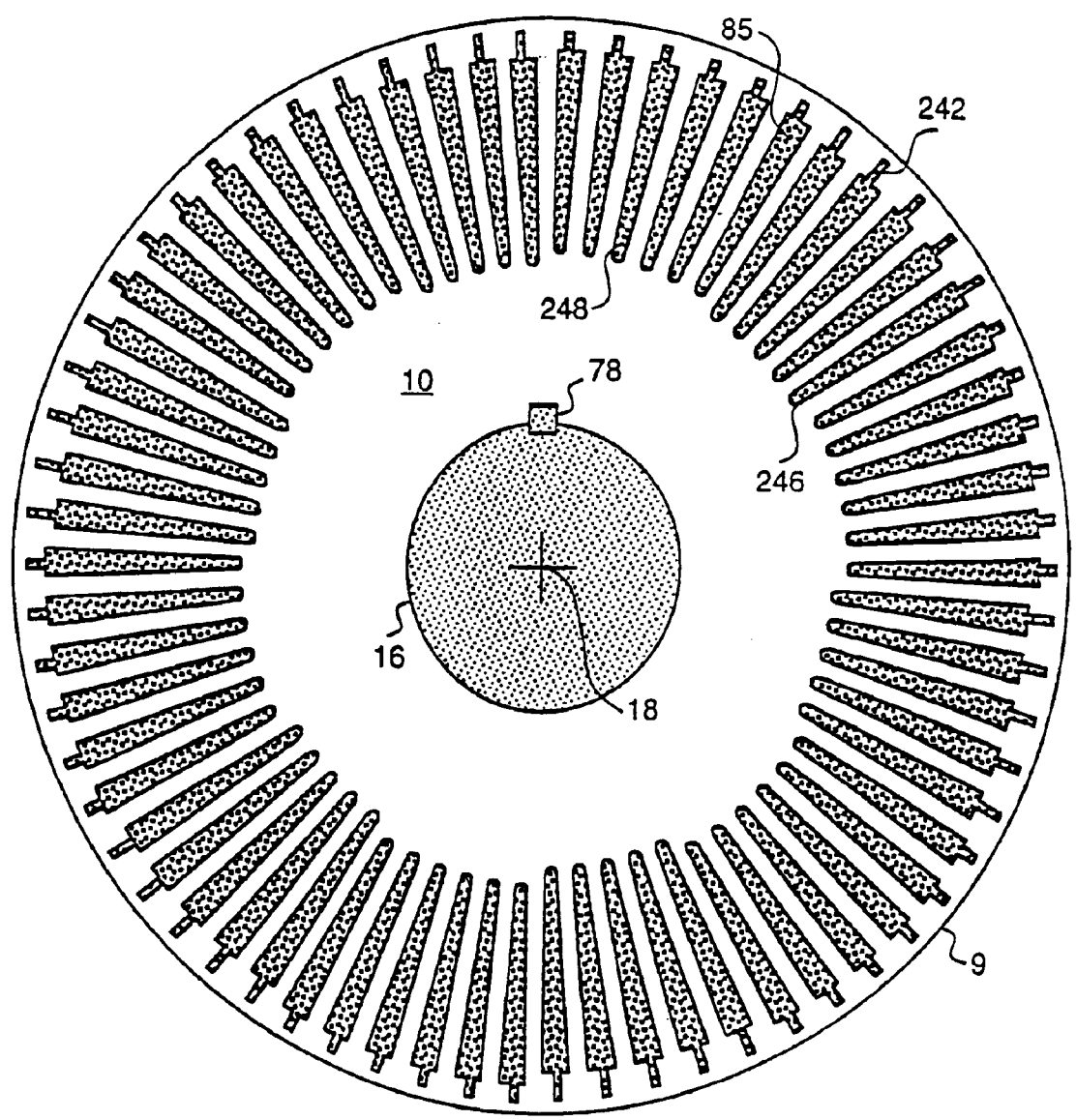

After stacking, the rotor cage can be cast and the rotor can be machined to the desired diameter. Unlike the above embodiments, the cast aluminum is allowed to completely fill the slit region. During the machining, the rotor slot bridges are preferably removed to create open slots and expose the cage aluminum as shown in FIG. 16.

Figure 17:
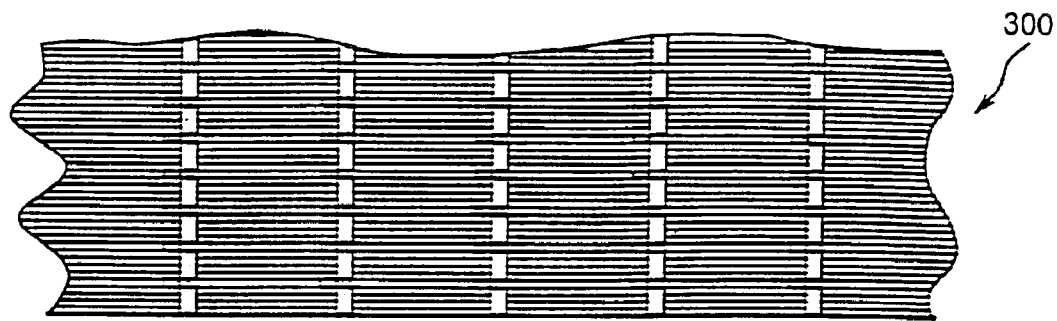
FIGS. 17 and 18 are sectional side views of selected lamination stacking embodiments.
Figure 18:
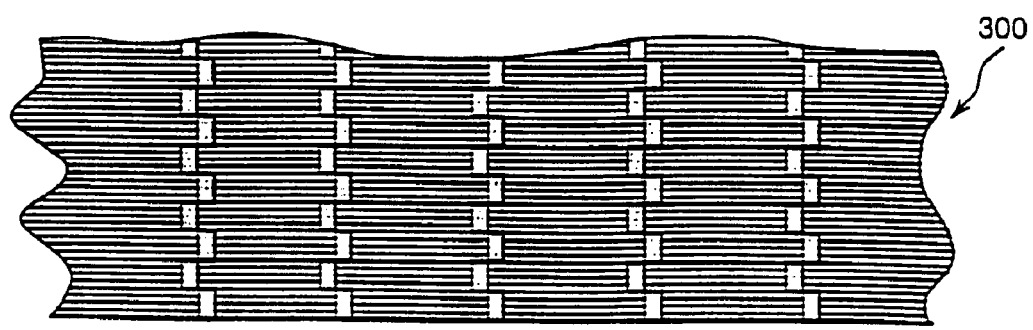

FIGS. 17 and 18 are sectional side views of selected lamination stacking embodiments. In FIG. 17, every fifth lamination is flipped horizontally and rotated by six slots counterclockwise. In FIG. 18, the laminations are flipped and rotated in groups of four. Because the rotor slots are asymmetrical, the electrical path through the slit region is effectively discontinuous even though it is filled with cast aluminum; i.e., the slit region appears to be nonconductive to all but very high frequency currents. Electrical currents including the AC signal currents used for sensorless control are therefore largely excluded from the slit region and confined predominately to the main rotor slot region. With the AC signal currents confined to the main slot region, a variation in leakage inductance at the AC signal frequency is created that is directly dependent upon the variation in length of the slits.

The optimum number of laminations per grouping between flipping and rotation depends on the lamination thickness as well as the frequencies of the inverter harmonics and the signal injection. The total distance of each grouping preferably ranges from about ⅛ of an inch (0.32 centimeters) to about ½ of an inch (1.27 centimeters). Thicker laminations stack to a total distance with fewer laminations than thinner laminations stacking to the same distance. Higher frequencies require more frequent lamination flipping. To minimize harmonic losses caused by inverter excitation, the lamination flipping should generally be as frequent as is practical. Too much flipping will increase the amount of undesirable flux that jumps crosswise from one lamination edge to another in the slit region. To achieve the proper lamination orientation during stacking, the amount of rotation will depend upon the number of slots, the number of poles, and the slit depth variation pattern. During stacking, the laminations can be successively rotated by one or more pole pitches to maintain stack uniformity.

Removal of slot bridges 241 during machining significantly reduces the unwanted effects of localized tooth tip and slot bridge saturation due to loading. The fundamental current flowing at slip frequency is also confined to the main rotor slot region and therefore experiences a uniform rotor bar resistance. Thus torque production is not degraded by the length modulation.

FIGS. 19–32 illustrate rotor slot embodiments (and several associated graphs) of the present invention that are useful for creating resistance modulation in induction motors designed for sensorless control. These embodiments are particularly useful with cast rotors in closed rotor slot embodiments. The majority of induction motors with cast rotor cages have closed rotor slots to minimize manufacturing costs. However, the slot designs can also be used in open or semi-closed rotor slot designs to achieve the same desirable rotor resistance asymmetry or spatial modulation.

Figure 19:
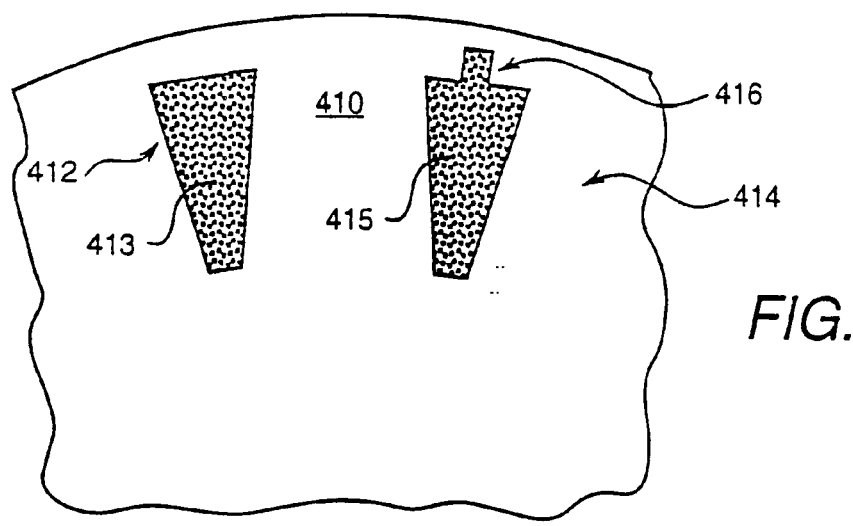
FIG. 19 is a top view of two rotor slots of the present invention.

FIG. 19 is a top view of two rotor slots 412 and 414 of a rotor 410 of the present invention with rotor slot 414 including an extension 416. Preferably, the rotor slot shapes are of substantially equal cross-sectional areas such that the conductive bars 413 and 415 of the slots, including the bar extensions, have substantially equal resistances at direct current and low slip frequencies, particularly at rated slip frequency of the motor. Substantially equal resistances at rated slip frequency are important to ensuring that undesirable torque pulsations are not introduced at slip frequency.

Typically rated slip frequencies are in the range of 0.1 Hz to 5 HZ depending upon the particular motor size and design and the inverter switching frequency. Typical frequencies at which an AC signal will be injected for resistance modulation range from about 20 to about 2000 Hz.

As rotor excitation frequencies increase past slip frequency, rotor bar resistances increase. The rate of increasing rotor bar resistance is higher for the shape of slot 414 than for the shape of slot 412 due to conductor skin effects. As rotor excitation frequencies increase past the AC signal injection frequency, the difference in the increases becomes more substantial. The skin effects force the high slip frequency current to the outer portion of rotor bar into the rotor extension 416. Although shown as rectangular, rotor extension 416 may comprise any shape capable of creating the desired resistance profile. Other useful shapes, for example, include semicircles and ovals.

Figure 20:
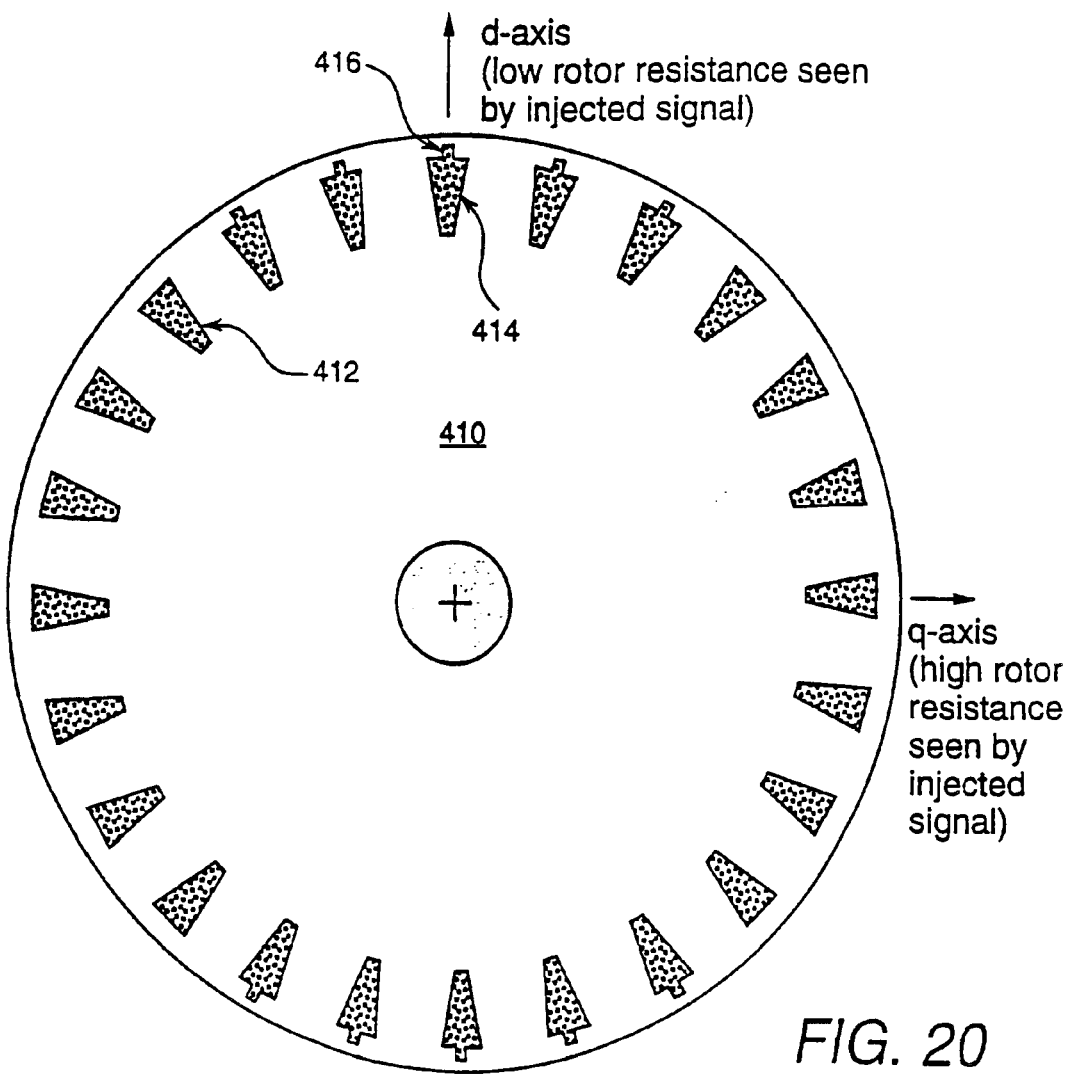
FIG. 20 is a top view of the rotor slots of FIG. 19 in a lamination for use in a two pole machine.

FIG. 20 is a top view of the rotor slots of FIG. 19 in a lamination for use in a two pole machine. By using the two slot shapes 412 and 414 in this manner, a desired spatial modulation in the net rotor resistance as seen at the injection frequency from stator terminals (not shown) can be created. With a sinusoidally distributed stator winding, the effective rotor resistance can achieve a nearly sinusoidal spatial modulation even though the individual bar resistances change abruptly.

Figure 21:
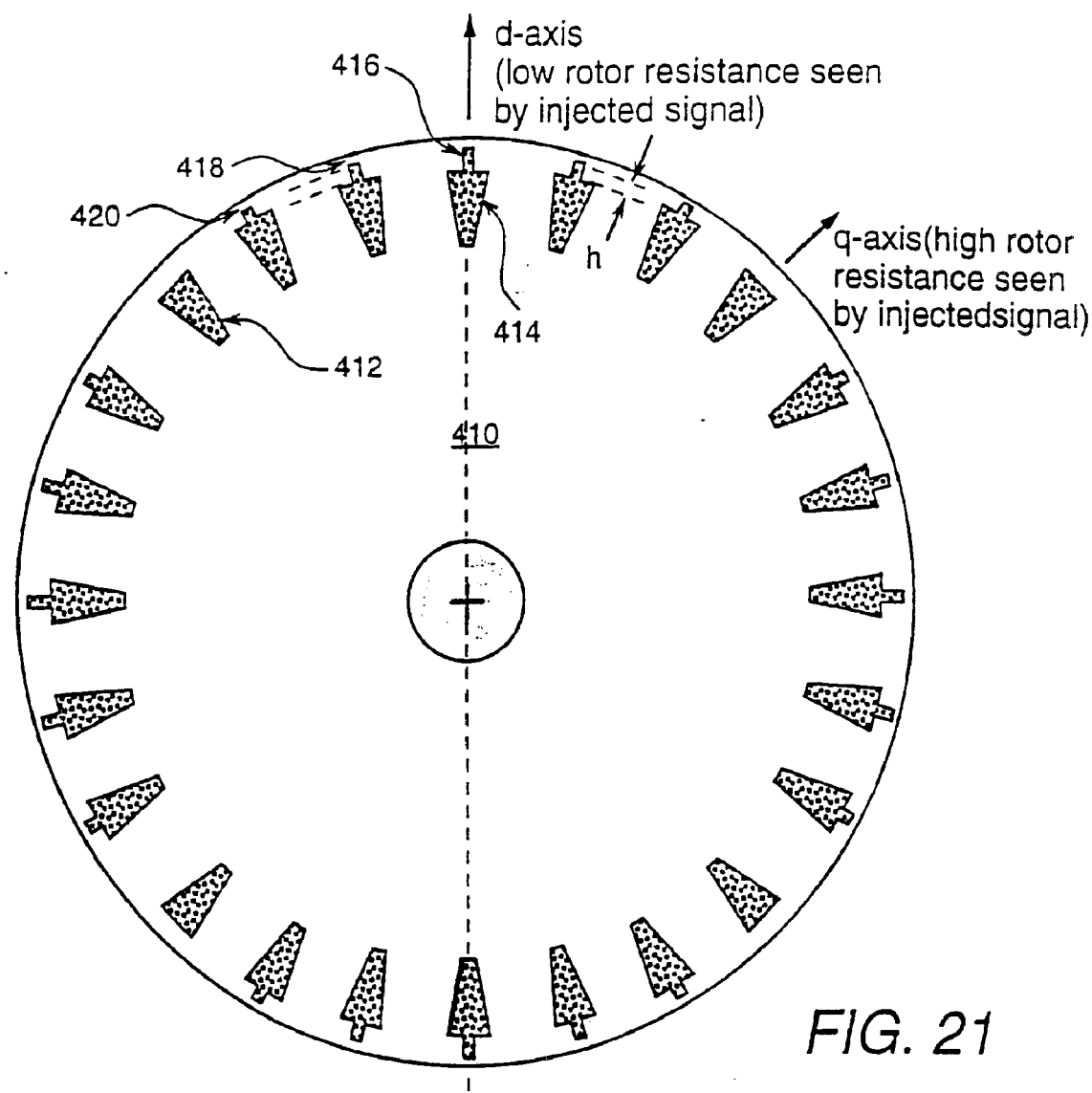
FIG. 21 is a top view of rotor slots in a lamination for use in a four pole machine.

FIG. 21 is a top view of rotor slots in a lamination for use in a four pole machine illustrating an embodiment where the individual bar resistances change less abruptly than the resistances of FIG. 20. In FIG. 21, the heights (h) of the extensions of the rotor bars are incrementally increased with extension 416 being shorter than extension 418 which in turn is shorter than extension 420.

The embodiments of FIGS. 19–21 are capable of achieving trackable spatial modulation in rotor resistance. The extensions do create additional harmonic losses with inverter switching and thus can reduce motor efficiency and create increased motor heat loss.

FIGS. 22–23, 25–30, and 32 are top views of additional rotor slot shape variations of the present invention which do not require extensions. These slot shapes can be replicated around a rotor lamination in a manner similar to that shown in FIG. 20 or 21, for example.

Figure 22:
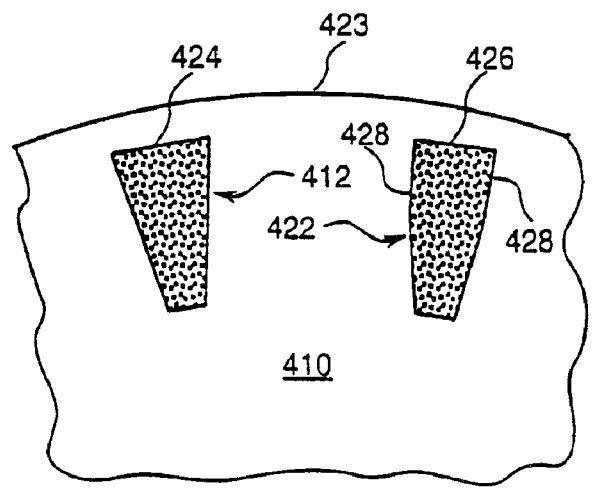
FIGS. 22–23 are top views of additional rotor slot shape variations of the present invention.

In FIG. 22, some of the of rotor slots 412 have outer slot surfaces 424 facing an outer perimeter 423 of the laminations that are longer than outer slot surfaces 426 of some others of the plurality of rotor slots 422 that face the outer perimeter of the laminations while the cross sectional areas of the rotor slots remain substantially equal. As stated above, preferably, the cross sectional areas are within one percent of each other such that the DC resistances of each bar are essentially identical. Although the differences in bar resistances at higher rotor excitations frequencies is not as dramatic as the embodiment of FIG. 19, a sufficiently large rotor resistance modulation can still be obtained at a signal injection frequency without excessive harmonic losses at the inverter switching frequencies.

Figure 24:
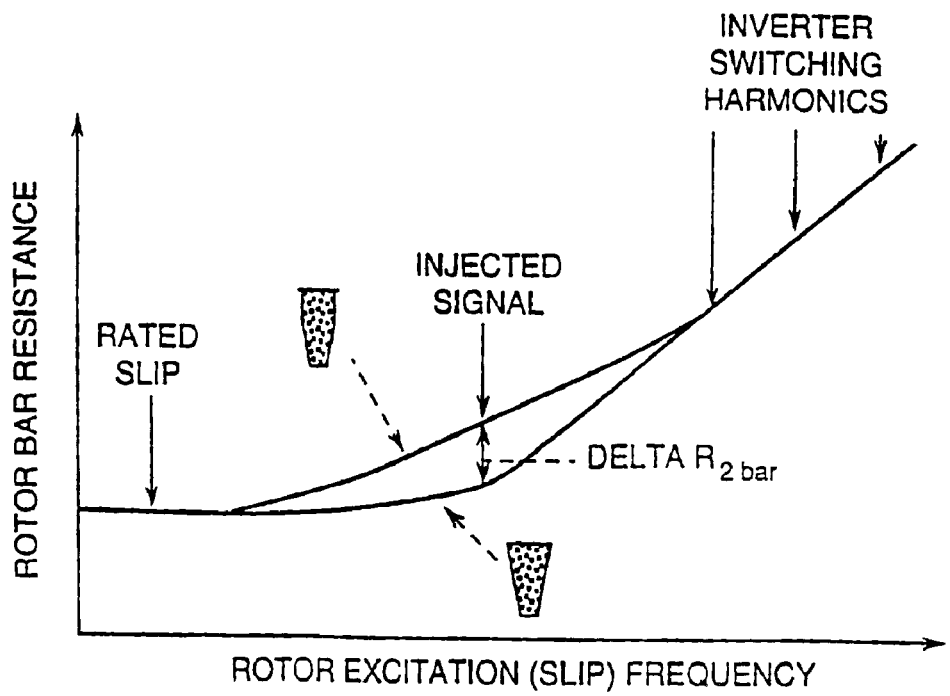
FIG. 24 is a simulation graph of rotor bar resistances as a function of rotor excitation for the embodiment of FIG. 23.
Figure 23:
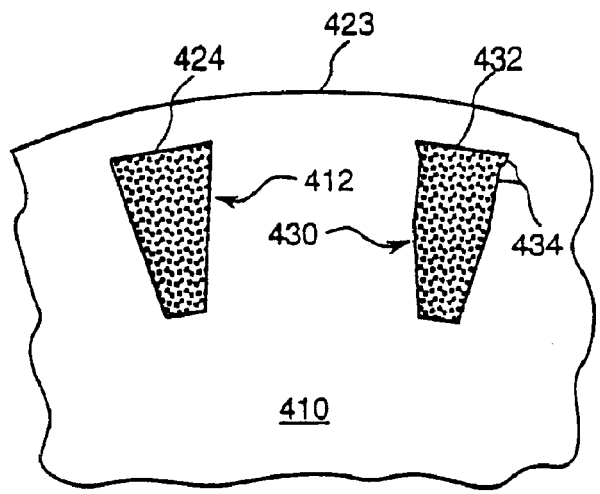
Figure 25:
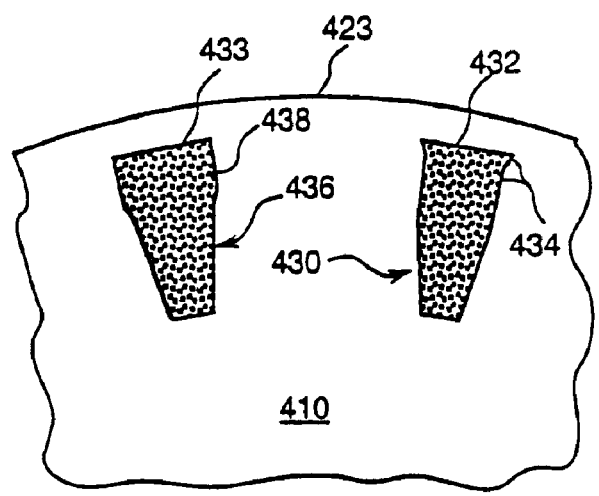
FIGS. 25–30 are top views of additional rotor slot shape variations of the present invention.

In FIG. 23, the harmonic losses at the inverter switching frequencies are further reduced narrowing the rotor slot 430 at portions 434. FIG. 24 is a simulation graph of rotor bar resistances as a function of rotor excitation for the embodiment of FIG. 23. By narrowing the slot just below outer slot surface 432 while maintaining substantially equal distances for outer slot surfaces 424 and 432, and substantially equal cross-sectional areas, the resistances of the rotor bars are substantially equal at slip frequencies and inverter switching harmonics while the resistance modulation is maintained in the area of the signal injection frequency. Thus no significant increase in losses are created at the inverter switching harmonics.

The present invention includes other slot/bar shapes that achieve rotor resistance modulation for tracking rotor position and velocity. For example, in FIG. 25, the distances of outer slot surfaces 422 and 432 and about the same, but, by narrowing slot side surfaces 434 just below outer slot surface 432 and maintaining the slot 436 at side surfaces 438 just below outer slot surface 433, rotor resistance modulation is created at signal injection frequencies.

Figure 26:
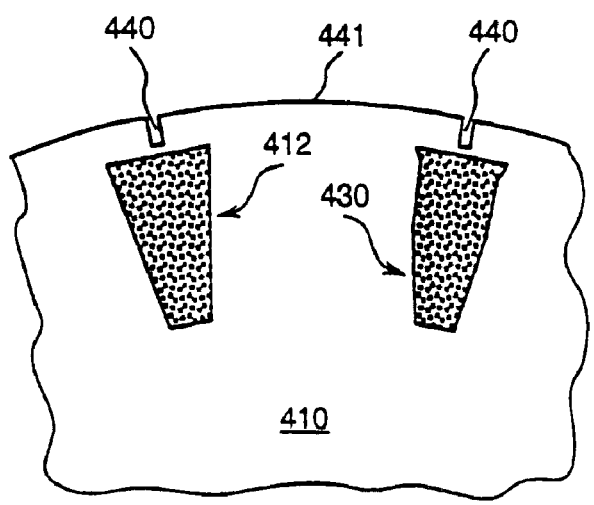
Figure 27:
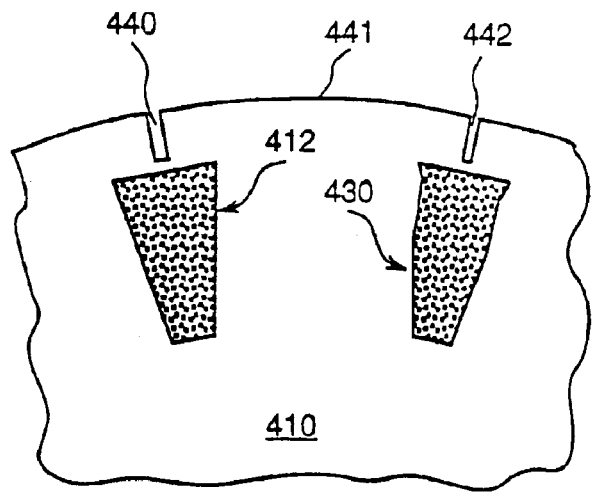

In FIG. 26, air slits 440 are added between slots 412 and 430 and the outer perimeter 441 of the rotor to minimize variation in rotor leakage inductance due to saturation. In FIG. 27, the widths of air slits 440 and 442 are different to create a spatial modulation in rotor leakage inductance in addition to, and aligned with, the modulation of rotor resistance.

Figure 28:
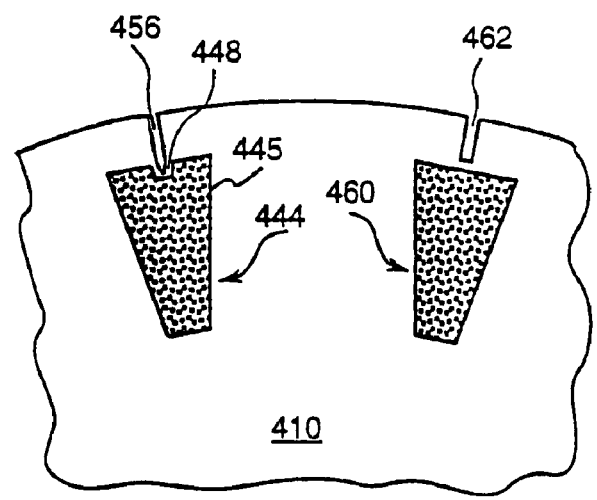

In FIG. 28, slot 444 includes a bridge 448 with slit 456 extending therein to further minimize bar resistance of bar 445 at signal injection and inverter switching frequencies.

Figure 29:
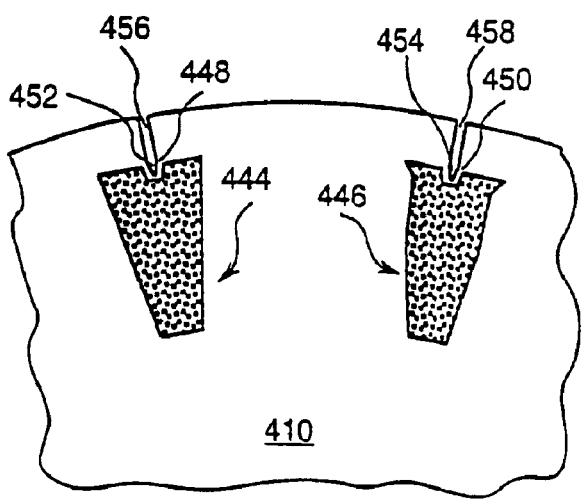

In FIG. 29, both slots 444 and 446 have bridges 448 and 450 permitting air slits 456 and 458 to extend into the main slot portion to minimize resistance at signal injection and inverter switching frequencies with resistance modulation at signal injection frequency for tracking being created by differing slot/bar distances just below the outer surfaces of the slots/bars.

Figure 30:
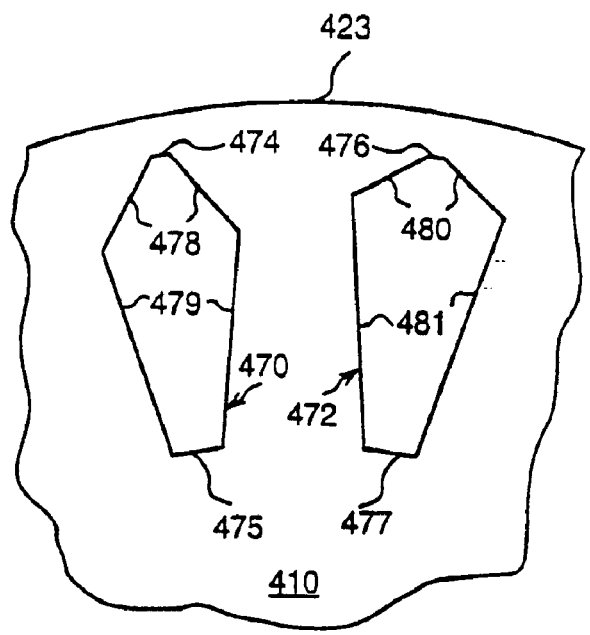
Figure 31:
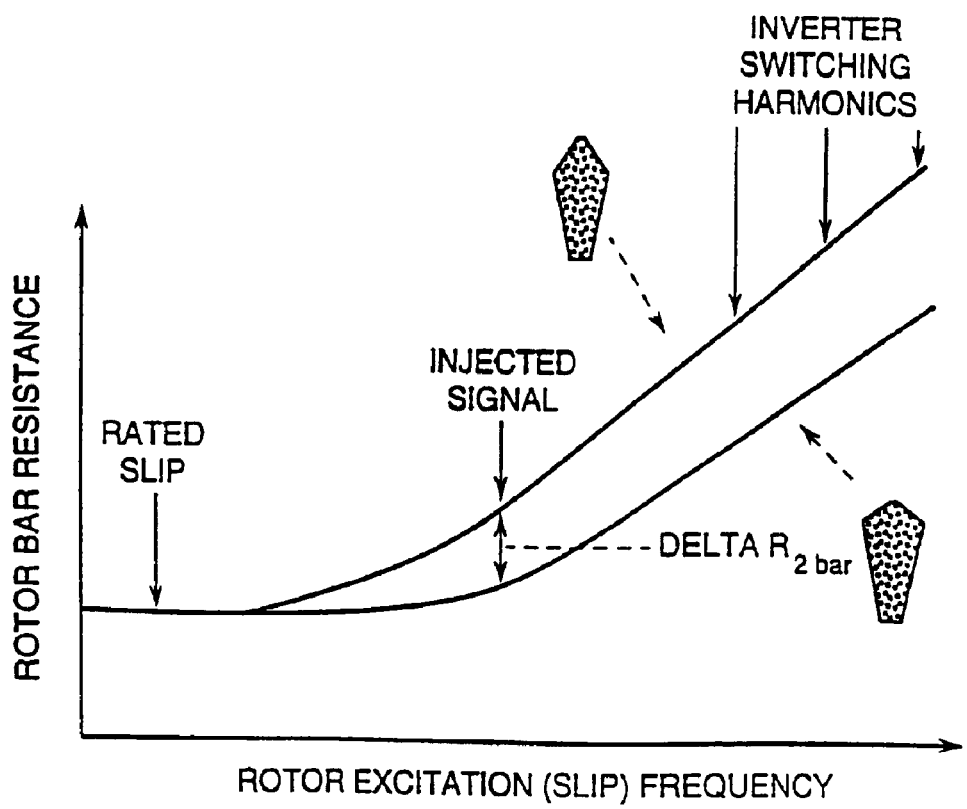
FIG. 31 is a simulation graph of rotor bar resistances as a function of rotor excitation for the embodiment of FIG. 30.

In FIG. 30, slots 470 and 472 each have similar outer slot surfaces 474 and 476 with respective first side surfaces 478 and 480 having different angles and second side surfaces 479 and 481 having different angles with respect to respective inner slot surfaces 475 and 477. FIG. 31 is a simulation graph of rotor bar resistances as a function of rotor excitation for the embodiment of FIG. 30. In this embodiment the resistances of the rotor bars are substantially equal at slip frequencies, the resistance modulation is maintained in the area of the signal injection frequency, and some losses are created at the inverter switching harmonics as the resistance of a rotor bar in slot 470 increases at a faster rate than the resistance of a rotor bar in slot 472. In another related embodiment (not shown), outer slot surfaces 474 and 476 have different lengths. In this embodiment the cross sectional areas can remain constant even if the angles of the side surfaces are not different.

Figure 32:
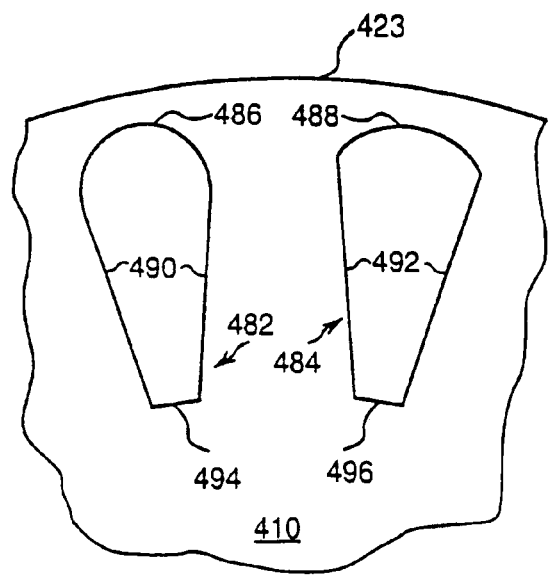
FIG. 32 is a top view of an additional rotor slot shape variation of the present invention.

FIG. 32 is a top view of an additional rotor slot shape variation of the present invention. In FIG. 32, slots 482 and 484 have respective curved outer slot surfaces 486 and 488 with different radii of curvature. Slots 482 and 484 can optionally have respective side surfaces 490 and 492 with different angles with respect to inner slot surfaces 494 and 496. This embodiment provides increased resistance in the rotor bar of slot 482 in the area of the signal injection frequency.

After punching and stacking laminations formed with the slots described with respect to FIGS. 19–32, conventional rotor cage die casting methods can be used to fabricate the rotor. A key-way or one or more alignment holes is useful to ensure correct orientation of the rotor laminations during punching and stacking. If compound dies are used to simultaneously punch all rotor slots in a lamination, no special fixtures are needed.

If indexed notching dies are used to punch rotor slots, multiple dies will be used with one die being used for each shape, and the punch press should be capable of indexing the rotor lamination without punching.

FIGS. 33–38 illustrate rotor slot embodiments of the present invention that are useful for creating inductance (FIGS. 33–38) and resistance (FIGS. 36–38) modulation in induction motors designed for sensorless control. In these embodiments the slot shapes are uniform and the modulation is achieved by rotor lamination shape or by slot inserts.

Figure 33:
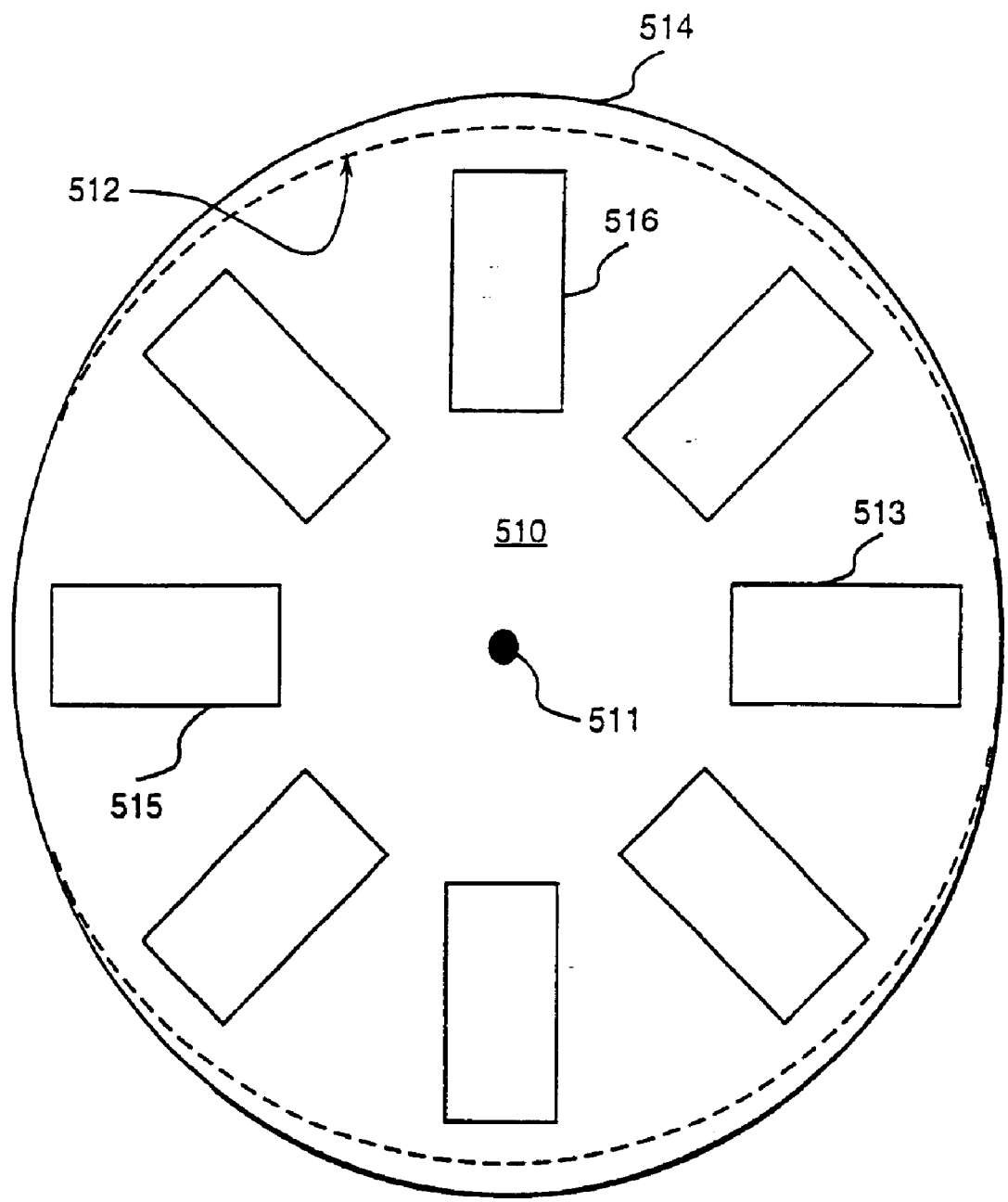
FIG. 33 is a top view of a rotor lamination of the present invention having an oblong shape.

FIG. 33 is a top view of a rotor lamination 510 of the present invention having an oblong shape. In this embodiment, slots 516 are substantially identical and each spaced about the same distance from a center point 511 of rotation. The blanking die (not shown) for the rotor laminations however is shaped to create the desired modulation. Dotted line 512 illustrates a normal round (circular) rotor shape whereas solid line 514 illustrates the shape of the rotor of this embodiment of the present invention.

The spatial modulation in inductance results because the oblong shape of the lamination causes slot 515 to be closer to the outer edge 514 than slot 516. Rotor slot 515 will thus have a lower magnetizing and leakage inductance than slot 516. The embodiment of FIG. 33 is appropriate for a two pole machine. For a four pole machine, an additional pair of elongated portions (not shown) could be formed around slots 513 and 515, for example.

Figure 34:
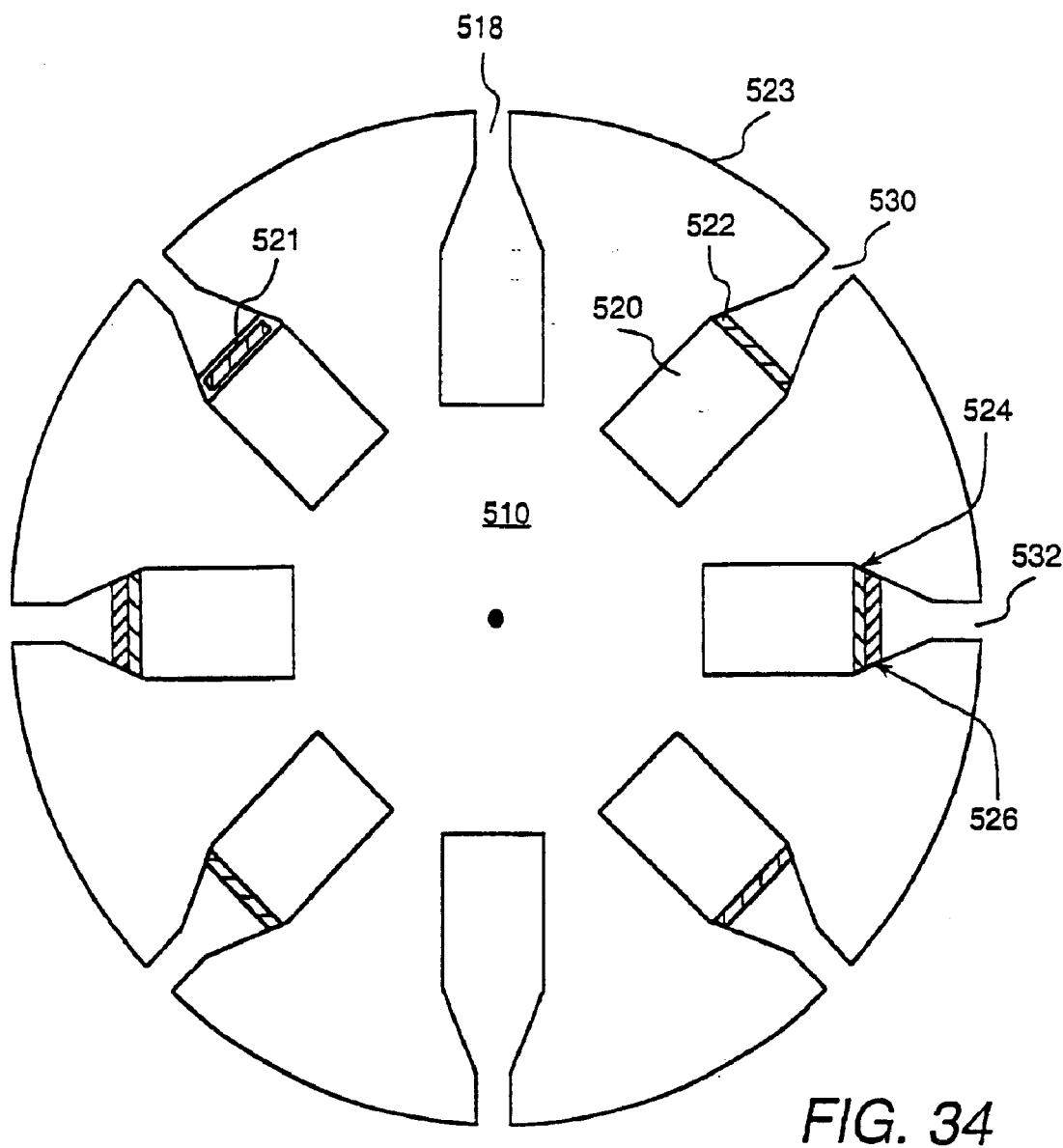
Figure 37:
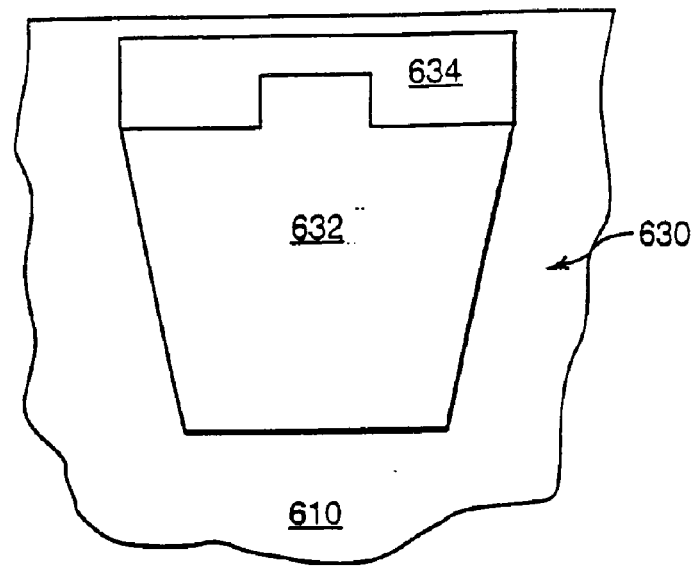
Figure 38:
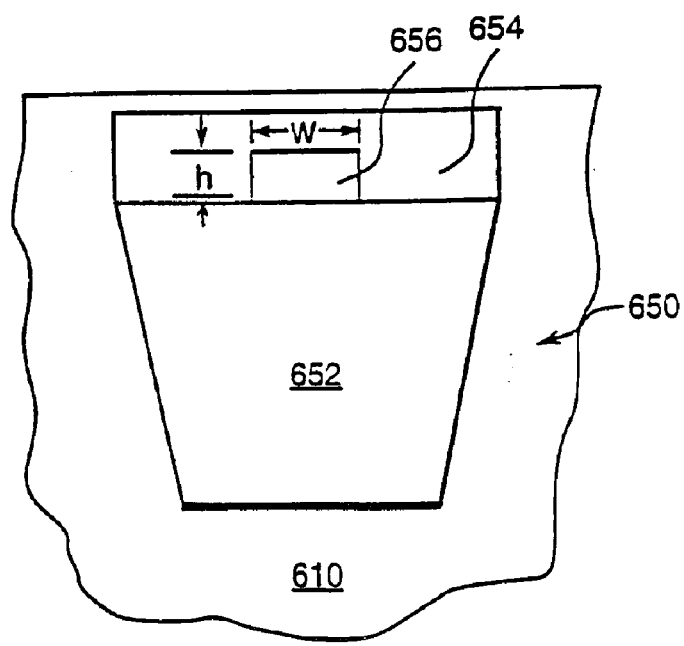

FIG. 34 is a top view of a rotor lamination of the present invention illustrating the insertion of magnetic inserts 522, 524, and 526 between rotor bars 520 and the outer perimeter 523 of the rotor laminations. FIG. 34 also illustrates the use of open rotor slots 518. Closed rotor slot embodiments are shown in FIGS. 37 and 38.

In one embodiment, the magnetic inserts comprise a molded magnetic material. One example of a useful molded material for applications where temperatures do not exceed 200° C. is an iron powder mixed with a plastic or an epoxy. For higher temperatures, iron flakes can be compacted without a binder.

The slots are shaped to accommodate the insertion of various shapes and/or numbers of magnetic inserts. The magnetic inserts can either be inserted before or after the insertion of rotor bars depending on the particular design.

If the rotor bars are prefabricated, it is convenient to position the magnetic inserts after inserting the rotor bars. If the rotor bars will be cast in the rotor slots, then at least one magnetic insert will be positioned in each slot prior to rotor bar casting. For cast rotor bars, it is useful to coat the magnetic inserts with an inorganic material, shown for example as inorganic coating 521, to fill any pores of the magnetic inserts and increase the mechanical strength of the magnetic inserts.

In the example of FIG. 34, slot 518 has no magnetic insert, slot 530 has one magnetic insert, and slot 532 has two magnetic inserts to create a relatively smooth variation in leakage inductance.

Generally the maximum achievable relative permeability of molded magnetic materials is only about 350 to 400. Lower permeabilities can be used to reduce rotor saturation and flux. These lower permeabilities are easily achieved by reduced molding pressure and/or by mixing non-magnetic materials with the magnetic materials prior to molding. Thus, inductance modulation may be accomplished by inserting multiple layers or sizes of materials of like permeability or by making pieces of different permeabilities. In either embodiment, the amount of added inductance can be regulated by the molded density as well as the geometry.

Figure 35:
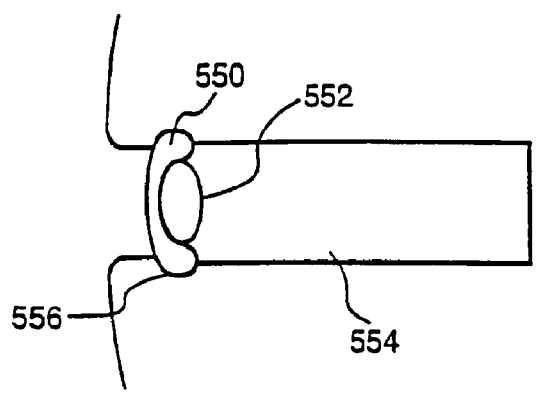

FIG. 35 is a view of a magnetic slot wedge formed with a magnetic insert comprising laminations 550 surrounding a rod 552. In one embodiment the laminations comprise iron or steel and the bar comprises a glass composite rod. This embodiment is useful for prefabricated rotor bars. Preferably slot 544 includes notches 556 for insertion of the laminations.

Figure 36:
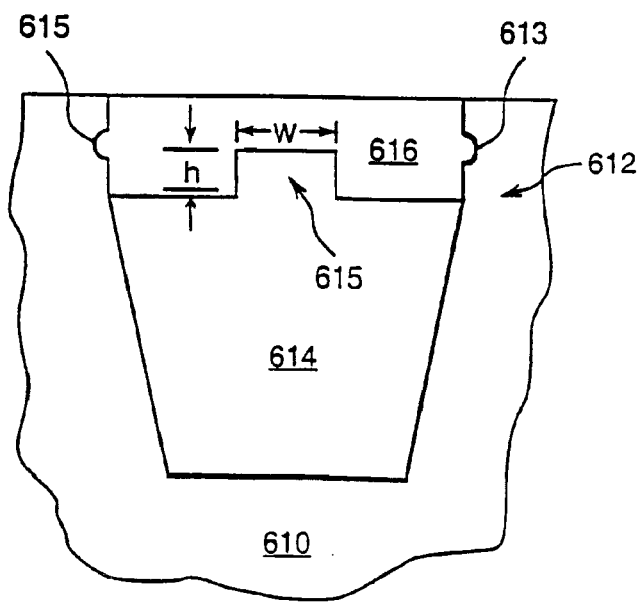
FIGS. 34–38 are top views of rotor laminations of the present invention illustrating the use of magnetic inserts.

FIGS. 36–38 are additional views of magnetic slot wedges of the present invention which are useful for modulation in embodiments which do not require multiple notching dies. In these embodiments, rotor slots of a lamination 610 can be formed with a single slot shape. Different magnetic insert/rotor bar 614 shapes can then be used to provide different resistance modulation patterns for the uniform slot shapes. Because permeability of a magnetic slot wedge can be adjusted over a wide range, such adjustments can be used to enhance the inductance variation in addition to (to enhance sensitivity or reliability) or instead of the resistance variation.

In FIGS. 36 and 37, for example, magnetic inserts 616 can be adjusted so that the width w and/or height h varies and the corresponding projections 615 of rotor bars 614 thus vary. These embodiments are particularly useful for cast rotor bars. In FIG. 36, the slots 612 are open and notches 613 are used to assist in holding the magnetic inserts 615 in position. In FIG. 37, the slots 630 are closed.

For prefabricated rotor bars, it may be impractical to have different shaped rotor bars. In the embodiment of FIG. 38, rotor bar main portions 652 can each have the same shape with resistance modulation provided by using filler bars 656 having different heights h and/or widths w for the extensions. The magnetic inserts 654 and filler bars 656 can efficiently be made in a variety of shapes and/or sizes resulting in reduced costs and enhanced flexibility. The magnetic insert may be formed around the filler bar after the filler bar and rotor bar are positioned, or the magnetic insert may be positioned around the filler bar prior to insertion into the slot.

Another method for achieving resistance modulation is to use the embodiment of FIG. 35 but to vary the size of rod 552 and change the material of rod 52 to copper or aluminum.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for fabricating an induction motor rotor lamination comprises:
    using an indexed notching die to punch a plurality of closed rotor slots at different distances from a center point of rotation by
    punching at least one first rotor slot,
    changing the position of a center point of the rotor lamination with respect to the notching die, and
    punching at least one second rotor slot.

2. The method of claim 1 wherein punching the at least one first rotor slot includes punching a corresponding first rotor slit and punching the at least one second rotor slot includes punching a corresponding second rotor slit.

3. The method of claim 2 wherein each rotor slit is separated from its respective rotor slot by a bridge.

4. The method of claim 3 wherein each rotor slit is open to the outer surface of the rotor lamination.

5. A method for fabricating an induction motor rotor lamination comprises:
    punching a plurality of closed rotor slots and rotor slits in a lamination;
    using an indexed notching die having a wider rotor slit to selectively punch and widen predetermined ones of the rotor slits.

6. The method of claim 5 wherein each rotor slit is separated from its respective rotor slot by a bridge.

7. A method for fabricating an induction motor rotor lamination comprises:
    punching a plurality of rotor slit patterns using a variable depth indexed notching die including at least two rotor slit punching portions, one of the rotor slit punching portions being deeper than another of the rotor slit punching portions, by
    punching a first rotor slit pattern,
    changing the depth of closure of the notching die, and
    punching a second rotor slit pattern, the second rotor slit pattern having a different number of rotor slits than the first rotor slit pattern.

8. The method of claim 7 further including punching a plurality of rotor slots, each rotor slot situated between a respective rotor slit pattern and a center point of the rotor lamination.

9. The method of claim 8 wherein each of the rotor slots is punched at about the same distance from a center point of rotation.

10. The method of claim 9 wherein each rotor slit is separated from its respective rotor slot by a bridge.

11. A method for fabricating an induction motor rotor lamination comprises:
    punching a plurality of rotor slits, and
    punching a plurality of rotor slots at different distances from a center point of rotation with each rotor slot being open to and off center with respect to its respective rotor slit.

* * * * *